(12) United States Patent
Watanabe et al.

(10) Patent No.: US 11,971,102 B2
(45) Date of Patent: Apr. 30, 2024

(54) GASKET

(71) Applicant: NOK CORPORATION, Tokyo (JP)

(72) Inventors: Takeshi Watanabe, Fukushima (JP);
Tokunori Yanagi, Shizuoka (JP); Isao Tanji, Fukushima (JP)

(73) Assignee: NOK CORPORATION (JP)

( * ) Notice: Subject to any disclaimer, the term of this patent is extended or adjusted under 35 U.S.C. 154(b) by 149 days.

(21) Appl. No.: 17/603,357

(22) PCT Filed: May 12, 2020

(86) PCT No.: PCT/JP2020/018935
§ 371 (c)(1),
(2) Date: Oct. 13, 2021

(87) PCT Pub. No.: WO2020/235390
PCT Pub. Date: Nov. 26, 2020

(65) Prior Publication Data
US 2022/0178445 A1    Jun. 9, 2022

(30) Foreign Application Priority Data

May 21, 2019   (JP) .................................. 2019-095506

(51) Int. Cl.
*F16J 15/06*   (2006.01)
*F16J 15/12*   (2006.01)
*F16J 15/08*   (2006.01)

(52) U.S. Cl.
CPC ...... *F16J 15/121* (2013.01); *F16J 2015/0856* (2013.01)

(58) Field of Classification Search
CPC ............. F16J 2015/0856; F16J 15/0818; F16J 15/121; F02F 11/00
See application file for complete search history.

(56) References Cited

U.S. PATENT DOCUMENTS

| 126,624 | A | * | 5/1872 | Na | ........................ F16J 15/106 277/649 |
| 2,060,498 | A | * | 11/1936 | Gobb | ....................... F16J 15/02 165/135 |

(Continued)

FOREIGN PATENT DOCUMENTS

| DE | 102014017575 A1 | 6/2015 |
| EP | 1350993 A2 | 10/2003 |

(Continued)

OTHER PUBLICATIONS

International Search Report (English and Japanese) of the International Searching Authority issued in PCT/JP2020/018935, dated Jul. 28, 2020; ISA/JP (5 pages).

*Primary Examiner* — Eugene G Byrd
(74) *Attorney, Agent, or Firm* — Harness, Dickey & Pierce, P.L.C.

(57) ABSTRACT

A gasket, to be installed between a first housing and a second housing, includes a first loop-shaped portion in a loop shape, a second loop-shaped portion in a loop shape that is positioned at a radially inner side of the first loop-shaped portion, with a first gap between the first loop-shaped portion and the second loop-shaped portion, and a first connector portion connecting the first loop-shaped portion and the second loop-shaped portion in a part of the first gap.

20 Claims, 13 Drawing Sheets

(56) References Cited

U.S. PATENT DOCUMENTS

| | | | | |
|---|---|---|---|---|
| 5,564,714 | A * | 10/1996 | Katsuno | B29C 37/02 |
| | | | | 277/924 |
| 6,390,479 | B1 * | 5/2002 | Combet | F16J 15/123 |
| | | | | 264/273 |
| 7,866,670 | B2 * | 1/2011 | Dhole | F02F 11/00 |
| | | | | 277/592 |
| 9,638,089 | B2 * | 5/2017 | Shaver | F16J 15/0825 |
| 9,714,504 | B2 * | 7/2017 | Bird | E03C 1/24 |
| 10,151,393 | B2 | 12/2018 | Ota et al. | |
| D921,168 | S * | 6/2021 | Wehrli | D23/262 |
| 2004/0155412 | A1 | 8/2004 | Ueta et al. | |
| 2008/0211197 | A1 | 9/2008 | Abe et al. | |
| 2011/0114232 | A1 * | 5/2011 | Nakao | C22C 38/40 |
| | | | | 148/333 |
| 2014/0203523 | A1 | 7/2014 | Anzai et al. | |
| 2015/0211637 | A1 | 7/2015 | Aihara et al. | |
| 2016/0265661 | A1 | 9/2016 | Ota et al. | |

FOREIGN PATENT DOCUMENTS

| | | |
|---|---|---|
| JP | 2000-161493 A | 6/2000 |
| JP | 2013-011300 A | 1/2013 |
| JP | 2013-036607 A | 2/2013 |
| JP | 2013-061002 A | 4/2013 |
| JP | 2016-169797 A | 9/2016 |
| WO | 2003-085293 A1 | 10/2003 |

* cited by examiner

GASKET

CROSS REFERENCE TO RELATED APPLICATIONS

This application is a U.S. National Phase Application under 35 U.S.C. 371 of International Application No. PCT/JP2020/018935, filed on May 12, 2020, which claims priority to Japanese Patent Application No. 2019-095506, filed on May 21, 2019. The entire disclosures of the above applications are expressly incorporated by reference herein.

BACKGROUND

Technical Field

The present invention relates to a gasket.

Related Art

There have been proposed various types of gaskets to be installed between a pair of housings. For example, Japanese Patent Application Laid-Open Publication No. 2013-36607 discloses a gasket in which there is formed a bead portion that protrudes toward one of the housings along an inner periphery thereof. In addition, Japanese Patent Application Laid-Open Publication No. 2013-61002 discloses a gasket in which a bent portion is formed that inclines downward along an outer peripheral edge thereof.

When corrosion occurs on a contact surface between a housing and a gasket, a minute gap may be formed between the housing and the gasket (that is, at a sealed surface) due to corrosion, thereby decreasing the sealing ability. Therefore, liquid may infiltrate, between parts in which corrosion has occurred at the sealed surface of the housing and the gasket, from outside of the housing, and infiltrate into the housing. In view of the above circumstances, an object of the present invention is to prolong the sealing ability by reducing infiltration of liquid toward the inside of the housing.

SUMMARY

To solve the above problem, a gasket according to one aspect (a first aspect) of the present invention is a gasket to be installed between a first housing and a second housing. The gasket includes a first loop-shaped portion in a loop shape, a second loop-shaped portion in a loop shape that is positioned at a radially inner side of the first loop-shaped portion, with a first gap between the first loop-shaped portion and the second loop-shaped portion, and a first connector portion connecting the first loop-shaped portion and the second loop-shaped portion in a part of the first gap. In the present aspect, a first gap extending in a circumferential direction is formed between the first loop-shaped portion and the second loop-shaped portion. Having reached the first gap between the first loop-shaped portion and the second loop-shaped portion, liquid infiltrating between the housing and the first loop-shaped portion from the outside of the housing infiltrates in a circumferential direction along the first gap. Accordingly, infiltration of the liquid along a radial direction is reduced. Therefore, as compared with a configuration in which the first gap is not formed, infiltration of liquid into the housing can be reduced. In other words, sealing ability can be prolonged in spite of corrosion at a sealing surface of the housing (and the sealing ability can be maintained over a long period of time).

The "loop-shaped" means a shape formed by a linear line that loops to surround a space or a curved line that loops to surround a space. The planar shape of the "loop-shaped portion" (also called "annular portion") may be freely selected. For example, each of the planar shapes of the first loop-shaped portion and the second loop-shaped portion may be circular or be multiangular (for example, rectangular).

Furthermore, in the first aspect, the first loop-shaped portion and the second loop-shaped portion are specified. However, the scope of the first aspect obviously includes a configuration including a loop-shaped portion other than both the first loop-shaped portion and the second loop-shaped portion. In other words, the first loop-shaped portion and the second loop-shaped portion mean two loop-shaped portions being adjacent to each other in the radial direction, from among a plurality of loop-shaped portions included in the gasket. The number of loop-shaped portions constituting the gasket may be freely selected. The first loop-shaped portion is not limited to the outermost loop-shaped portion from among the plurality of loop-shaped portions, and the second loop-shaped portion is not limited to the innermost loop-shaped portion from among the plurality of loop-shaped portions.

In a preferred example of the first aspect (a second aspect), the first connector portion is thinner than both the first loop-shaped portion and the second loop-shaped portion. In the configuration described above, a recess is formed due to a stepped portion between a surface of the first loop-shaped portion or a surface of the second loop-shaped portion and a surface of the first connector portion. In other words, in a state in which a gasket is installed between the first housing and the second housing, the first gap continues in the circumferential direction via the recess. In the configuration described above, liquid flows between a portion of the first gap positioned on one side of the first connector portion in the circumferential direction and a portion of the first gap positioned on the other side of the first connector portion in the circumferential direction. Accordingly, a volume sufficient for accumulating the liquid is ensured in the first gap. Therefore, as compared with a configuration in which the first connector portion is as thick as each of the first loop-shaped portion and the second loop-shaped portion, infiltration of liquid into the housing can be reduced. Each of the thicknesses of the first connector portion, the first loop-shaped portion, and the second loop-shaped portion comprises a dimension in a direction parallel to a central axis of the gasket.

A gasket in a preferred example of the second aspect (a third aspect) includes a plate-like base portion made of metal and an elastic layer that partly covers the base portion. Each of the first loop-shaped portion and the second loop-shaped portion is a portion including the base portion and the elastic layer, and the first connector portion is a portion that includes the base portion and does not include the elastic layer. In the configuration described above, since the elastic layer is in contact with the housing with the elastic layer being elastically deformed, sealing ability can be improved. Furthermore, an advantage is obtained in that a recess corresponding to the first connector portion is formed by a simple configuration in which the elastic layer is not formed on a portion of the base portion corresponding to the first connector portion.

In a preferred example of the first aspect (a fourth aspect), the first connector portion is as thick as each of the first loop-shaped portion and the second loop-shaped portion. In the configuration described above, since the first connector portion is as thick as each of the first loop-shaped portion and the second loop-shaped portion, manufacturing costs are less compared to a configuration in which the first connector portion is thinner than each of the first loop-shaped portion and the second loop-shaped portion.

In a preferred example of the fourth aspect (a fifth aspect), the first loop-shaped portion, the second loop-shaped portion, and the first connector portion each include a plate-like base portion made of metal, and an elastic layer that covers the base portion. In the configuration described above, in addition to the first loop-shaped portion and the second loop-shaped portion, the first connector portion is also constituted by a lamination layer of the base portion and the elastic layer. Accordingly, the first loop-shaped portion, the second loop-shaped portion, and the first connector portion have the same cross-section structure. Therefore, as compared with a configuration in which the cross-section structure of the first connector portion is different from the cross-section structure of the first loop-shaped portion or the second loop-shaped portion, an advantage is obtained in that manufacturing costs are less.

A gasket according to any one of the preferred examples of the first to fifth aspects (a sixth aspect) includes a third loop-shaped portion in a loop shape, disposed at a radially inner side of the second loop-shaped portion, with a second gap between the second loop-shaped portion and the third loop-shaped portion, and a second connector portion that connects the second loop-shaped portion and the third loop-shaped portion in a part of the second gap. In the configuration described above, according to the present aspect, the first gap and the second gap, each extending in the circumferential direction, are formed between the first loop-shaped portion and the third loop-shaped portion. Therefore, the effect is particularly significant in that infiltration of liquid into the housing can be reduced.

In a preferred example of the sixth aspect (a seventh aspect), the first connector portion and the second connector portion are in a same position circumferentially. Furthermore, in another preferred example of the sixth aspect (an eighth aspect), the first connector portion and the second connector portion are in different positions circumferentially. In the present aspect, since the first connector portion and the second connector portion are in different positions circumferentially, liquid infiltrating along the first connector portion needs to move in the circumferential direction until reaching the second connector portion. Accordingly, as compared with the configuration in which the first connector portion and the second connector portion are in a same position circumferentially, a longer time is required for the liquid to reach the inside of the third loop-shaped portion. Therefore, infiltration of the liquid into the housing can be reduced over a long period of time. In the configuration in which the first connector portion is as thick as each of the first loop-shaped portion and the second loop-shaped portion, when the first connector portion and the second connector portion are in the same position circumferentially, liquid infiltrating from the outside of the housing easily infiltrates from the first connector portion to the second connector portion in the radial direction continuously. Therefore, the eighth aspect is particularly effective in the configuration in which the first connector portion is as thick as each of the first loop-shaped portion and the second loop-shaped portion.

In a preferred example of any one of the sixth to eight aspects (a ninth aspect), a width of the first gap is different from a width of the second gap. In an exemplary aspect (a tenth aspect), the width of the second gap is greater than the width of the first gap. According to the present aspect, it is possible to ensure a sufficient period of time from a time point when liquid starts to infiltrate the first gap or the second gap, which is wider, until a point in time when the liquid fills the wider gap. Therefore, it is possible to reduce the infiltration of the liquid into the housing over a long period of time.

In a preferred example of any one of the first to tenth aspects (an eleventh aspect), there is formed in the first loop-shaped portion a through hole into which a fastener is inserted, which fastener connects the first housing and the second housing, and the first connector portion is formed in a vicinity of the through hole. In a vicinity of the fastener, the first housing and the second housing are fastened to each other by the fastener, and thereby compress the gasket sufficiently. In other words, there is a tendency that liquid barely infiltrates in the vicinity of the through hole in the gasket, as compared with other portions of the gasket. On the other hand, the liquid infiltrating a space between the housing and the gasket may infiltrate in the radial direction along the first connector portion. Therefore, according to the configuration in which the first connector portion is installed in the vicinity of the through hole, it is possible to effectively reduce infiltration of the liquid via the first connector portion.

A gasket according to a preferred example of any one of the first to tenth aspects (a twelfth aspect) further includes a third connector portion that connects the first loop-shaped portion and the second loop-shaped portion in a part of the first gap, wherein a space between the first connector portion and the third connector portion is a through hole into which a fastener is inserted, the fastener connecting the first housing and the second housing. There is a tendency for the liquid to barely infiltrate portions in the vicinity of the through hole in the gasket, as compared with other portions of the gasket. Therefore, according to the eleventh aspect, probability is decreased that the liquid will infiltrate the housing from vicinities of the first connector portion and the third connector portion. Furthermore, in a preferred aspect (a thirteenth aspect), the first connector portion and the third connector portion are positioned at the inner side of an outer peripheral edge of a bearing surface of the fastener in planar view. According to the above aspect, the effect is particularly significant in that it is possible to reduce the infiltration of liquid into the housing from the vicinities of the first connecting part and the third connecting part.

In a preferred example of any one of the first to thirteenth aspects (a fourteenth aspect), there is formed a protrusion that protrudes toward the first housing on a surface of at least one of the first loop-shaped portion or the second loop-shaped portion, the surface facing the first housing. In the present aspect, since the protrusion in at least one of the first loop-shaped portion and the second loop-shaped portion is in contact with the first housing, it is possible to reduce the infiltration of liquid from between the first housing and the gasket.

In a preferred example of any one of the first to thirteenth aspects (a fifteenth aspect), on a facing surface of the first loop-shaped portion facing the first housing, there is formed a first protrusion that protrudes toward the first housing along a shape of the first loop-shaped portion, and on a facing surface of the second loop-shaped portion facing the first housing, there is formed a second protrusion that protrudes toward the first housing along a shape of the second loop-shaped portion. According to the present aspect, since the first protrusion and the second protrusion are in contact with the first housing, it is possible to effectively reduce the infiltration of liquid from between the first housing and the gasket.

In a preferred example of any one of the first to thirteenth aspects (a sixteenth aspect), on a facing surface of the first loop-shaped portion facing the first housing, there is formed a first protrusion that protrudes toward the first housing along a shape of the first loop-shaped portion, and on a facing surface of the second loop-shaped portion facing the second housing, there is formed a second protrusion that protrudes toward the second housing along a shape of the second loop-shaped portion. According to the present aspect, it is possible to reduce the infiltration of liquid from a space between the first housing or the second housing and the gasket. Furthermore, since the first protrusion and the second protrusion each protrude in a direction opposite to the other, an effect is obtained in that warping in the gasket can be reduced.

In a preferred example of any one of the first to sixteenth aspects (a seventeenth aspect), a hydrophilic film is formed on an inner peripheral surface of at least one of the first loop-shaped portion or the second loop-shaped portion, the hydrophilic film covering the inner peripheral surface. According to the present aspect, since the hydrophilic film facilitates infiltration of liquid having reached the inside of the first gap along an inner peripheral surface of the first loop-shaped portion, the infiltration of the liquid into the housing can be delayed.

A gasket according to a preferred aspect (an eighteenth aspect) of the present invention is a loop-shaped gasket installed between a first housing and a second housing. In the gasket, there is formed a protrusion in a loop shape that protrudes toward the first housing or the second housing along an inner peripheral edge of the gasket, and there is formed a gap along an outer peripheral edge of the gasket between the protrusion and the outer peripheral edge.

Effects of the Invention

According to one aspect of the present invention, it is possible to reduce infiltration of liquid toward an inside of a housing.

DETAILED DESCRIPTION

First Embodiment

Figure 1:
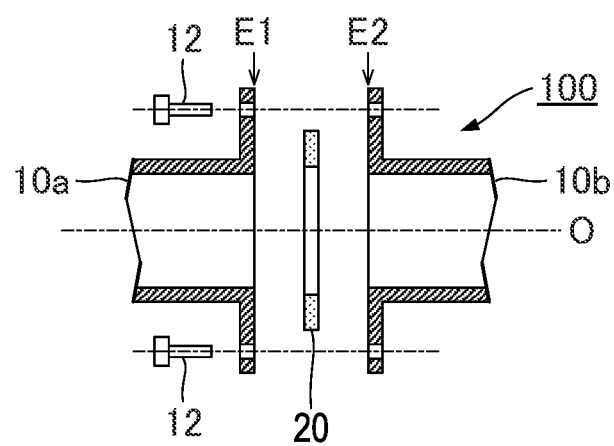
FIG. 1 is a cross-sectional view illustrating a configuration of a sealing structure according to a first embodiment.

FIG. 1 is a cross-sectional view illustrating a configuration of a sealing structure 100 according to a first embodiment. The sealing structure 100 according to the first embodiment is installed in a vehicle such as an automobile. The sealing structure 100 accommodates various types of electric components for controlling the motion of the vehicle. As shown in FIG. 1, the sealing structure 100 according to the first embodiment includes a first housing 10a, a second housing 10b, a plurality of fasteners 12, and a gasket 20.

The first housing 10a is a hollow structure including an end face E1 having an opening. Similarly, the second housing 10b is a hollow structure including an end face E2 having an opening. The first housing 10a and the second housing 10b are each formed of an alloy including a metal such as aluminum or iron. The first housing 10a and the second housing 10b are fixed to each other by the plurality of fasteners 12 (for example, bolts).

The gasket 20 is a loop-shaped sealing member installed between the first housing 10a and the second housing 10b. Specifically, the gasket 20 is placed between the end face E1 of the first housing 10a and the end face E2 of the second housing 10b. In other words, a surface of the gasket 20 facing the first housing 10a is in contact with the end face E1, and a surface of the gasket 20 facing the second housing 10b is in contact with the end face E2. According to the above configuration, the gasket 20 seals a gap between the end face E1 of the first housing 10a and the end face E2 of the second housing 10b. An inner space of the first housing 10a and an inner space of the second housing 10b communicate with each other via an opening in the gasket 20.

Figure 2:
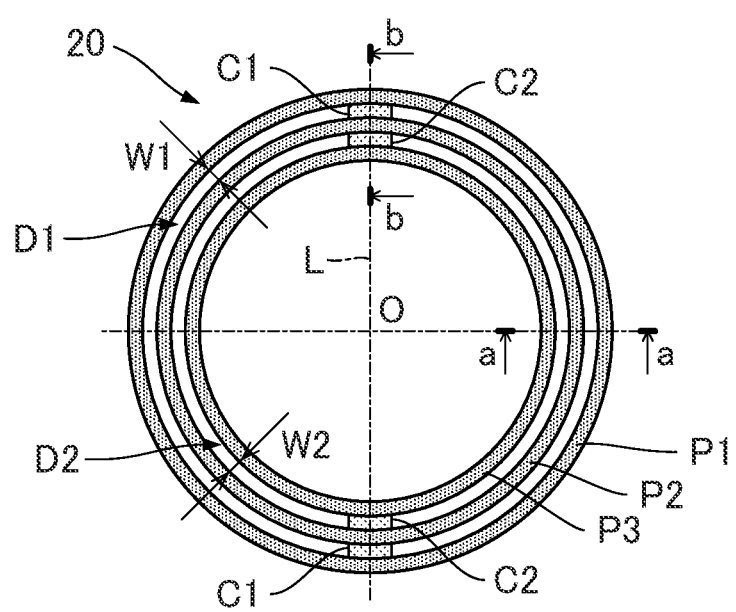
FIG. 2 is a plan view showing a gasket according to the first embodiment.

FIG. 2 is a plan view showing the gasket 20. As shown in FIG. 2, the gasket 20 includes a first loop-shaped portion P1, a second loop-shaped portion P2, a third loop-shaped portion P3, a plurality of first connector portions C1, and a plurality of second connector portions C2. In the following descriptions, "radial direction" denotes a direction of a radius of a circle having, as a center, a central axis O of the gasket 20 in a plane vertical to the central axis O, and "circumferential direction" denotes a direction of the circumference of the circle. Furthermore, "planar view" denotes observation of the gasket 20 from a direction parallel to the central axis O of the gasket 20.

Each of the first loop-shaped portion P1, the second loop-shaped portion P2, and the third loop-shaped portion P3 is a loop-shaped portion formed in a shape of a circle in planar view. The thicknesses (that is, the dimensions in the direction of the central axis O) of the first loop-shaped portion P1, the second loop-shaped portion P2, and the third loop-shaped portion P3 are identical to each other. Furthermore, the widths (that is, the dimensions in the radial direction) of the first loop-shaped portion P1, the second loop-shaped portion P2, and the third loop-shaped portion P3 are identical to each other. The thicknesses or the widths of the first loop-shaped portion P1, the second loop-shaped portion P2, and the third loop-shaped portion P3 may be different from each other, as long as the desired sealing ability is maintained.

As will be understood from FIG. 2, an outer diameter of the second loop-shaped portion P2 is smaller than an inner diameter of the first loop-shaped portion P1, and an outer diameter of the third loop-shaped portion P3 is smaller than an inner diameter of the second loop-shaped portion P2. The first loop-shaped portion P1, the second loop-shaped portion P2, and the third loop-shaped portion P3 are arranged concentrically in a common plane. Therefore, the second loop-shaped portion P2 is positioned radially at an inner side of the first loop-shaped portion P1, and the third loop-shaped portion P3 is positioned radially at an inner side of the second loop-shaped portion P2. In other words, the second loop-shaped portion P2 surrounds the third loop-shaped portion P3, and the first loop-shaped portion P1 surrounds the second loop-shaped portion P2.

A first gap D1 is formed between the first loop-shaped portion P1 and the second loop-shaped portion P2. In other words, the inner peripheral surface of the first loop-shaped portion P1 faces the outer peripheral surface of the second loop-shaped portion P2 with the first gap D1 therebetween. The first gap D1 is a gap (a slit) extending in the circumferential direction. Similarly, a second gap D2 is formed between the second loop-shaped portion P2 and the third loop-shaped portion P3. Accordingly, the inner peripheral surface of the second loop-shaped portion P2 faces the outer peripheral surface of the third loop-shaped portion P3 across the second gap D2. The second gap D2 is a gap extending in the circumferential direction. In the first embodiment, a width W1 of the first gap D1 is identical to a width W2 of the second gap D2 (W1=W2). For example, each of the width W1 of the first gap D1 and the width W2 of the second gap D2 has an appropriate numerical value in a range of, for example, from 0.1 to 10 millimeters, inclusive. The width W1 is the size of the first gap D1 in the radial direction, and the width W2 is the size of the second gap D2 in the radial direction.

Each of the plurality of (for example, two) first connector portions C1 connects the first loop-shaped portion P1 and the second loop-shaped portion P2 in a part of the first gap D1. Specifically, each of the first connector portions C1 extends in the radial direction from the surface of the inner periphery of the first loop-shaped portion P1 to the surface of the outer periphery of the second loop-shaped portion P2. The two first connector portions C1 are each positioned at an opposite side with respect to the central axis O of the gasket 20. Each of the plurality of (for example, two) second connector portions C2 connects the second loop-shaped portion P2 and the third loop-shaped portion P3 in a part of the second gap D2. Specifically, each of the second connector portions C2 extends in the radial direction from the surface of the inner periphery of the second loop-shaped portion P2 to the surface of the outer periphery of the third loop-shaped portion P3. The two second connector portions C2 are each positioned at an opposite side to each other with respect to the central axis O of the gasket 20.

As shown in FIG. 2, a position of one first connector portion C1 in the circumferential direction is identical to a position of one second connector portion C2 in the circumferential direction. In other words, the position of the first connector portion C1 in a direction along the shape of the gasket 20 is identical to the position of the second connector portion C2 in the direction along the shape of the gasket 20. Specifically, both the first connector portion C1 and the second connector portion C2 are positioned on a straight line L orthogonal to the central axis O of the gasket 20. In other words, the first connector portion C1 is positioned between the second connector portion C2 and the first loop-shaped portion P1 in planar view. The first connector portion C1 and the second connector portion C2 may be installed at different positions in the circumferential direction.

Figure 3:
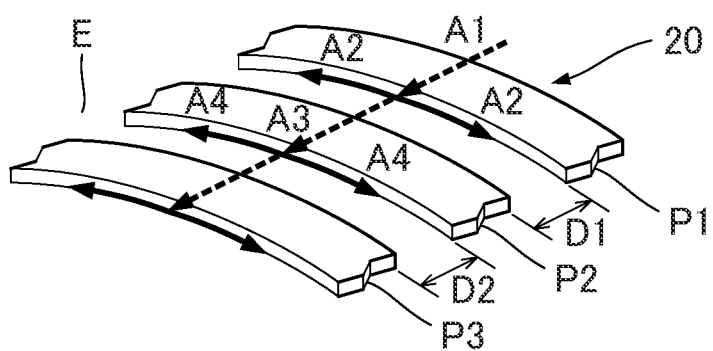
FIG. 3 is an explanatory diagram showing a state in which liquid infiltrates toward the inside of a housing.

Such a possibility is assumed in which liquid adhering to an exterior surface of the sealing structure 100 infiltrates the sealing structure 100 from between the first housing 10a and the second housing 10b. For example, when the sealing structure 100 is used in a coastal marine environment, salt water may adhere to the sealing structure 100. Furthermore, when the sealing structure 100 is used in a cold environment, an aqueous solution of a snow melting agent (for example, calcium chloride) may adhere to the sealing structure 100. FIG. 3 is an explanatory diagram showing a state in which liquid infiltrates into the sealing structure 100. Since the gasket 20 is in surface contact with the end face E (the end face E1 or the end face E2) of the housing 10 (the first housing 10a or the second housing 10b), liquid basically does not infiltrate into the inner space of the sealing structure 100. However, in a state in which fine irregularities are formed on the end face E due to corrosion caused by adherence of liquid such as salt water, the sealing ability of the gasket 20 decreases. Therefore, liquid may infiltrate between the end face E of the housing 10 and the first loop-shaped portion P1 of the gasket 20 from the outside of the sealing structure 100, as shown by arrow A1 in FIG. 3.

When liquid infiltrating a gap between the end face E and the first loop-shaped portion P1 reaches the first gap D1, the liquid infiltrates in the circumferential direction along the first gap D1 (a contact line of the inner peripheral surface of the first loop-shaped portion P1 and the end face E) due to wettability of the liquid, as shown by arrow A2 in FIG. 3. In other words, it is possible to inhibit the liquid from infiltrating toward the radially inner side. Therefore, as compared with a configuration in which the first gap D1 is not formed, it is possible to reduce infiltration of liquid toward the inside of the housing 10. As described above, according to the first embodiment, since infiltration of liquid toward the inside of the housing 10 is delayed, it is possible to reduce infiltration of liquid into the sealing structure 100 over a long period of time. In other words, as compared with the configuration in which the first gap D1 is not formed, the sealing ability of the gasket 20 can be prolonged even with corrosion of the sealing surface of the housing 10 (that is, the end face E1 and the end face E2).

Once liquid fills the first gap D1, as shown by arrow A3 in FIG. 3, the liquid may infiltrate a gap between the end face E of the housing 10 and the second loop-shaped portion P2 of the gasket 20. When the liquid infiltrating a gap between the end face E and the second loop-shaped portion P2 reaches the second gap D2, the liquid infiltrates in the circumferential direction along the second gap D2 (a contact line of the inner peripheral surface of the second loop-shaped portion P2 and the end face E) due to the wettability of the liquid, as shown by arrow A4 in FIG. 3. In other words, the infiltration of liquid toward the radially inner side is inhibited. Therefore, as compared with a configuration in which the second gap D2 is not formed, it is possible to inhibit the liquid from infiltrating toward an inner side of the housing 10. As will be understood from the above explanations, in the first embodiment, a state in which liquid infiltrates in the circumferential direction and a state in which liquid infiltrates in the radial direction forward inside are repeated multiple times. Therefore, the effect described above is particularly significant in which infiltration of liquid into the sealing structure 100 can be reduced over a long period of time.

Figure 4:
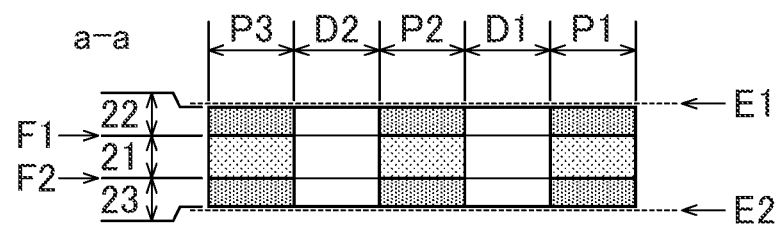
FIG. 4 is a cross-sectional view along a line a-a in FIG. 2.
Figure 5:
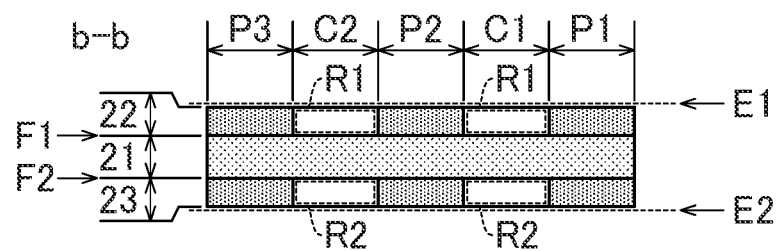
FIG. 5 is a cross-sectional view along a line b-b in FIG. 2.

A cross-section structure of the gasket 20 shown above will now be explained. FIG. 4 is a cross-sectional view along a line a-a in FIG. 2, and FIG. 5 is a cross-sectional view along a line b-b in FIG. 2. As shown in FIG. 4 and FIG. 5, the gasket 20 according to the first embodiment includes a base portion 21, a first elastic layer 22, and a second elastic layer 23 in a cross-sectional view. In the following descriptions, when it is not necessary to particularly distinguish the first loop-shaped portion P1, the second loop-shaped portion P2, and the third loop-shaped portion P3 from each other, these are collectively referred to as "loop-shaped portion P". Similarly, when it is not necessary to particularly distinguish the first connector portion C1 and the second connector portion C2 from each other, they are collectively referred to as "connector portion C".

The base portion 21 is a plate-shaped hard portion including a first face F1 and a second face F2. The base portion 21, for example, is made of metal. The first face F1 and the second face F2 are the surfaces of the base portion 21 on opposite sides in the direction of the central axis O. The base portion 21 is made of, for example, a stainless steel plate, a cold-rolled steel plate, a galvanized steel plate, or an aluminum plywood.

The first elastic layer 22 is an elastic film that partly covers the first face F1 of the base portion 21. Similarly, the second elastic layer 23 is an elastic film that partly covers the second face F2 of the base portion 21. For example, the first elastic layer 22 is bonded to the first face F1, to which surface treatment such as lead phosphate coating treatment has been performed, by an adhesive. Similarly, the second elastic layer 23 is bonded to the second face F2, to which surface treatment such as lead phosphate coating treatment has been performed, by an adhesive. A surface of the first elastic layer 22 is in surface contact with the end face E1 of the first housing 10a, and a surface of the second elastic layer 23 is in surface-contact with the end face E2 of the second housing 10b. The first elastic layer 22 and the second elastic layer 23 are examples of the "elastic layer".

The first elastic layer 22 and the second elastic layer 23 are made of a freely selected elastic material. Specifically, a synthetic rubber sheet (for example, foamed rubber) containing at least one type selected from, for example, nitrile rubber, styrene-butadiene rubber, fluoro-rubber, acrylic rubber, and silicone rubber is preferably used as the first elastic layer 22 and the second elastic layer 23. According to the above configuration, the sealing function of the gasket 20 can be improved by contact of the first elastic layer 22 with the first housing 10a and contact of the second elastic layer 23 with the second housing 10b.

As shown in FIG. 4 and FIG. 5, each loop-shaped portion P (P1, P2, P3) is a portion including a lamination layer of the base portion 21, the first elastic layer 22, and the second elastic layer 23. On the other hand, as shown in FIG. 5, each connector portion C (C1, C2) is a part including the base portion 21. The first elastic layer 22 and the second elastic layer 23 are not formed in each connector portion C. In other words, in the first connector portion C1, the first face F1 of the base portion 21 is exposed from the first elastic layer 22, and the second face F2 of the base portion 21 is exposed from the second elastic layer 23. As will be understood from the above explanations, the base portion 21 is formed in a planar shape corresponding to the first loop-shaped portion P1, the second loop-shaped portion P2, the third loop-shaped portion P3, each first connector portion C1, and each second connector portion C2. On the other hand, each of the first elastic layer 22 and the second elastic layer 23 is formed in a planar shape corresponding to the respective shapes of the first loop-shaped portion P1, the second loop-shaped portion P2, and the third loop-shaped portion P3. In other words, the first elastic layer 22 or the second elastic layer 23 does not include a part corresponding to the first connector portion C1 and the second connector portion C2. As will be understood from the above explanations, each connector portion C is thinner than each loop-shaped portion P. Accordingly, the thickness of each connector portion C corresponds to the thickness of only the base portion 21, whereas the thickness of each loop-shaped portion P corresponds to a sum total of the thicknesses of the base portion 21, the first elastic layer 22, and the second elastic layer 23.

The gasket 20 having the configuration shown above is manufactured by bonding to the surface of the base portion 21 the first elastic layer 22 and the second elastic layer 23, each of which has a planar shape corresponding to each loop-shaped portion P, where the base portion 21 is formed in a planar shape corresponding to each loop-shaped portion P and each connector portion C. In other words, in the first embodiment, the surface of the formed base portion 21 is covered with an elastic material (the first elastic layer 22 and the second elastic layer 23).

As shown in FIG. 5, a first recess R1 is formed corresponding to a stepped portion between the first face F1 of the base portion 21 in the first connector portion C1 or the second connector portion C2, and the surface of the first elastic layer 22. Similarly, a second recess R2 is formed corresponding to a stepped portion between the second face F2 of the base portion 21 in the first connector portion C1 or the second connector portion C2, and the surface of the second elastic layer 23. Therefore, in a state in which the gasket 20 is installed between the first housing 10a and the second housing 10b, the first gap D1 continues over the entire circumference of the gasket 20 through the first recess R1 and the second recess R2 that correspond to the first connector portion C1. Similarly, in a state in which the gasket 20 is installed between the first housing 10a and the second housing 10b, the second gap D2 continues over the entire circumference of the gasket 20 through the first recess R1 and the second recess R2 that correspond to the second connector portion C2. In the first embodiment, the first recess R1 and the second recess R2 can be formed by a simple configuration in which the first elastic layer 22 and the second elastic layer 23 are not formed in the first connector portion C1.

In the configuration described above, liquid that has reached the first gap D1, as shown by arrow A1 in FIG. 3, flows through the first recess R1, a gap between a portion of the first gap D1 positioned on one side of the first connector portion C1 in the circumferential direction and a portion of the first gap D1 positioned on the other side of the first connector portion C1 in the circumferential direction. Similarly, liquid that has reached the second gap D2, as shown by arrow A3 in FIG. 3, flows through the second recess R2, a gap between a portion of the second gap D2 positioned on one side of the second connector portion C2 in the circumferential direction and a portion of the second gap D2 positioned on the other side of the second connector portion C2 in the circumferential direction. As will be understood from the above explanations, according to the first embodiment, it is possible to ensure a volume sufficient for accumulating the liquid in the first gap D1 and the second gap D2, as compared with a configuration in which the first recess R1 and the second recess R2 are not formed. Therefore, the effect described above is particularly significant in that infiltration of liquid into the sealing structure 100 can be reduced over a long period of time.

Second Embodiment

A second embodiment according to the present invention is described. In each of the embodiments illustrated below, for elements having functions substantially the same as those of the first embodiment, reference signs used in the descriptions of the first embodiment are used, and detailed explanations of such elements are omitted as appropriate.

Figure 6:
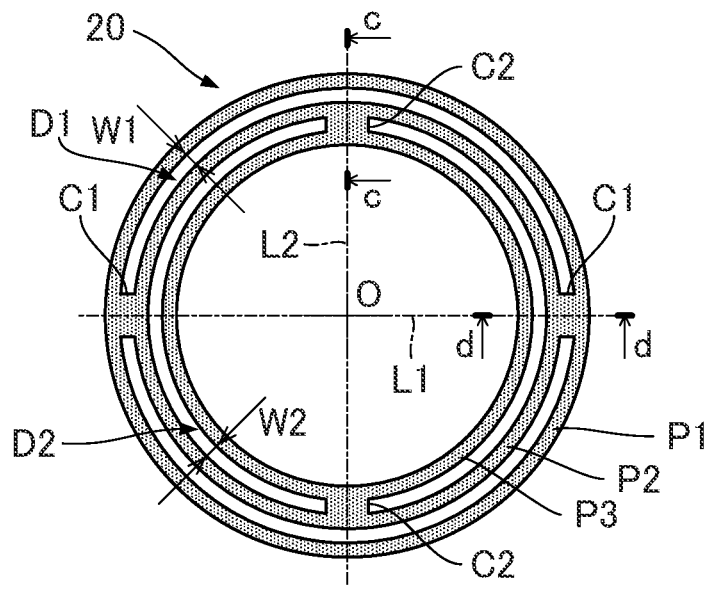
FIG. 6 is a plan view showing a gasket according to a second embodiment.

FIG. 6 is a plan view showing a gasket 20 according to the second embodiment. As shown in FIG. 6, the gasket 20 according to the second embodiment includes the first loop-shaped portion P1, the second loop-shaped portion P2, the third loop-shaped portion P3, the plurality of first connector portions C1, and the plurality of second connector portions C2, as in the first embodiment. Relationships of respective elements are substantially the same as those of the first embodiment. In other words, the second loop-shaped portion P2 is positioned at the radially inner side of the first loop-shaped portion P1 across the first gap D1, and the third loop-shaped portion P3 is positioned at the radially inner side of the second loop-shaped portion P2 across the second gap D2. Furthermore, each first connector portion C1 connects the first loop-shaped portion P1 and the second loop-shaped portion P2 in a part of the first gap D1, and each second connector portion C2 connects the second loop-shaped portion P2 and the third loop-shaped portion P3 in a part of the second gap D2. As described above, also in the second embodiment, infiltration of liquid is delayed by the first gap D1 and the second gap D2. Therefore, an advantage is obtained in that infiltration of liquid into the sealing structure 100 can be reduced, as in the first embodiment.

The first embodiment illustrates a configuration in which the first connector portion C1 and the second connector portion C2 are in the same position circumferentially. In the second embodiment, as shown in FIG. 6, the position (or position in a direction along the shape of the gasket 20) of the first connector portion C1 in the circumferential direction is different from the position of the second connector C2 in the circumferential direction. Specifically, each first connector portion C1 is positioned on a straight line L1 orthogonal to the central axis O of the gasket 20, and each second connector portion C2 is positioned on a straight line L2 orthogonal to the central axis O of the gasket 20. The straight line L1 and the straight line L2 intersect (for example, are orthogonal to each other). In other words, the first connector portion C1 is not positioned on the straight line L2, and the second connector portion C2 is not positioned on the straight line L2. In other words, the first connector portion C1 is not positioned between the second connector portion C2 and the first loop-shaped portion P1.

Figure 7:
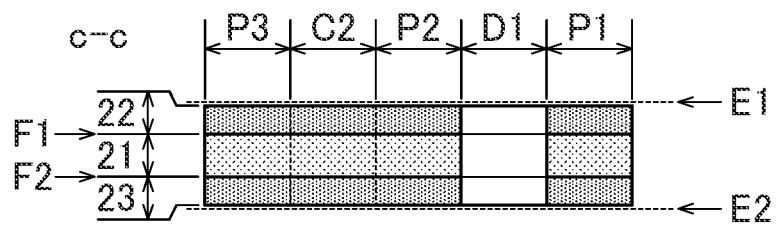
FIG. 7 is a cross-sectional view along a line c-c in FIG. 6.
Figure 8:
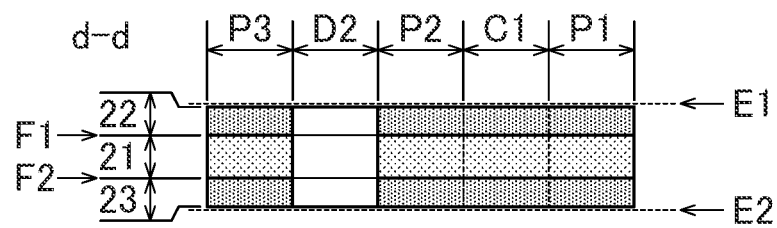
FIG. 8 is a cross-sectional view along a line d-d in FIG. 6.

FIG. 7 is a cross-sectional view along a line c-c in FIG. 6, and FIG. 8 is a cross-sectional view along a line d-d in FIG. 6. As shown in FIG. 7 and FIG. 8, in the second embodiment, the first connector portion C1 and the second connector portion C2 are also constituted by a lamination layer of the base portion 21, the first elastic layer 22, and the second elastic layer 23, in addition to the first loop-shaped portion P1, the second loop-shaped portion P2, and the third loop-shaped portion P3. In other words, a cross-section structure of each connector portion C is the same as that of each loop-shaped portion P. Therefore, each connector portion C has the same thickness as that of each loop-shaped portion P. As described above, in the second embodiment, since each loop-shaped portion P and each connector portion C have the same structure, an advantage is obtained in that manufacturing costs are reduced compared to a configuration in which the connector portion C and the loop-shaped portion P have different structures (for example, as in the first embodiment).

The gasket 20 according to the second embodiment is manufactured by partly punching a plate-like portion covered with an elastic film over the entire area of both of the first face F1 and the second face F2, for example, by press working (that is, by removing a region other than a part forming the gasket 20). In other words, the base portion 21, the first elastic layer 22, and the second elastic layer 23 are formed together. In the second embodiment, the base portion 21 is formed after elastic films to be the first elastic layer 22 and the second elastic layer 23 are formed, whereas in the first embodiment, after the base portion 21 is formed, the first elastic layer 22 and the second elastic layer 23 are installed.

In the configuration in which the thickness of the connector portion C is identical to the thickness of the loop-shaped portion P, when the position of the first connector portion C1 in the circumferential direction is identical to the position of the second connector portion C2 in the circumferential direction, liquid infiltrating from the outside of the sealing structure 100 easily infiltrates in the radial direction forward inside along the first connector portion C1, the second loop-shaped portion P2, and the second connector portion C2 continuously. In the second embodiment, although the connector portion C is as thick as the loop-shaped portion P, the position of the first connector portion C1 in the circumferential direction is different from the position of the second connector portion C2 in the circumferential direction. Therefore, the liquid infiltrating in the radial direction along the first connector portion C1 needs to flow in the circumferential direction until it reaches the second connector portion C2. In other words, in the second embodiment, a long time is required for the liquid to reach the inside of the housing 10, as compared with a configuration in which the position of the first connector portion C1 in the circumferential direction is identical to the position of the second connector portion C2 in the circumferential direction. Therefore, it is possible to reduce infiltration of liquid into the sealing structure 100 over a long period of time.

Third Embodiment

Figure 9:
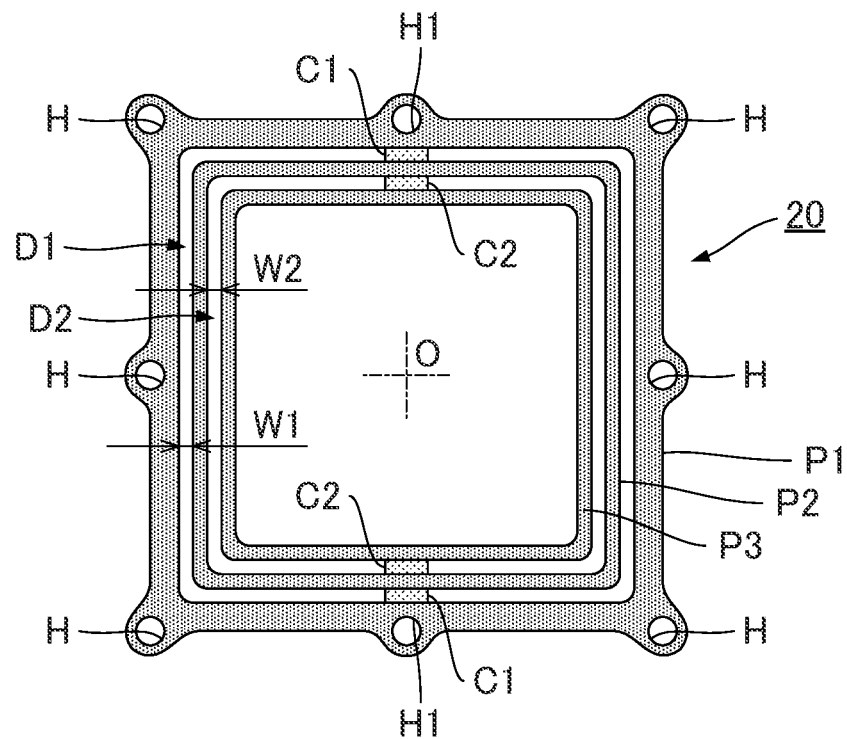
FIG. 9 is a plan view showing a gasket according to a third embodiment.

FIG. 9 is a plan view showing a gasket 20 according to a third embodiment. As shown in FIG. 9, the gasket 20 according to the third embodiment includes, as in the first embodiment, the first loop-shaped portion P1, the second loop-shaped portion P2, the third loop-shaped portion P3, the plurality of first connector portions C1, and the plurality of second connector portions C2. The planar shape of each loop-shaped portion P according to the third embodiment is a shape of a rectangular (for example, square) loop, whereas the planar shape of each loop-shaped portion P according to the first embodiment is a shape of a circular loop. The second loop-shaped portion P2 is positioned at a radially inner side of the first loop-shaped portion P1 across the first gap D1, and the third loop-shaped portion P3 is positioned in the inside of the second loop-shaped portion P2 across the second gap D2. The width W1 of the first gap D1 is identical to the width W2 of the second gap D2.

Furthermore, each first connector portion C1 connects the first loop-shaped portion P1 and the second loop-shaped portion P2 in a part of the first gap D1, and each second connector portion C2 connects the second loop-shaped portion P2 and the third loop-shaped portion P3 in a part of the second gap D2. As in the first embodiment, the position of the first connector portion C1 in the circumferential direction is identical to the position of the second connector portion C2 in the circumferential direction. In other words, the position of the first connector portion C1 in the direction along the shape of the gasket 20 is identical to the position of the second connector portion C2 in the direction along the shape of the gasket 20. As described above, also in the third embodiment, infiltration of liquid is delayed by the first gap D1 and the second gap D2. Therefore, it is possible to reduce the infiltration of liquid into the sealing structure 100 as in the first embodiment.

Furthermore, in the third embodiment, each loop-shaped portion P is constituted by a lamination layer of the base portion 21, the first elastic layer 22, and the second elastic layer 23, and each connector portion C is constituted by the base portion 21 as in the first embodiment. In other words, each connector portion C includes neither the first elastic layer 22 nor the second elastic layer 23. Therefore, each connector portion C is thinner than each loop-shaped portion P.

As shown in FIG. 9, a plurality of through holes H is formed in the first loop-shaped portion P1 according to the third embodiment. Each through hole H is a circular opening, into which a fastener 12 for fixing the first housing 10a and the second housing 10b to each other is inserted. Specifically, eight through holes H are formed at regular intervals. In FIG. 9, a reference sign H1 is allocated to two through holes H selected from the plurality of through holes H.

The first connector portion C1 and the second connector portion C2 are formed in a vicinity of the through hole H. Specifically, the first connector portion C1 is formed to include the nearest point to one through hole H1 in the first gap D1. In other words, the first connector portion C1 is formed between the through hole H1 and the central axis O in the first gap D1. Similarly, the second connector portion C2 is formed to include the nearest point to one through hole H1 in the second gap D2. In other words, the second connector portion C2 is formed between the through hole H1 and the central axis O in the second gap D2.

In a vicinity of the fastener 12, the first housing 10a and the second housing 10b are firmly fastened by the fastener 12 to compress the gasket 20 sufficiently. Therefore, liquid barely infiltrates in the vicinity of the through hole H in the gasket 20 as compared with other parts of the gasket 20, and as a result, there is a tendency for corrosion of the housing 10 to be reduced. In the third embodiment, since the first connector portion C1 and the second connector portion C2 are formed in the vicinity of the through hole H, the probability is reduced that liquid will infiltrate to the inside of the housing 10 via the first connector portion C1 or the second connector portion C2. Therefore, the effect is particularly significant in that infiltration of liquid into the sealing structure 100 can be reduced over a long period of time.

Fourth Embodiment

Figure 10:
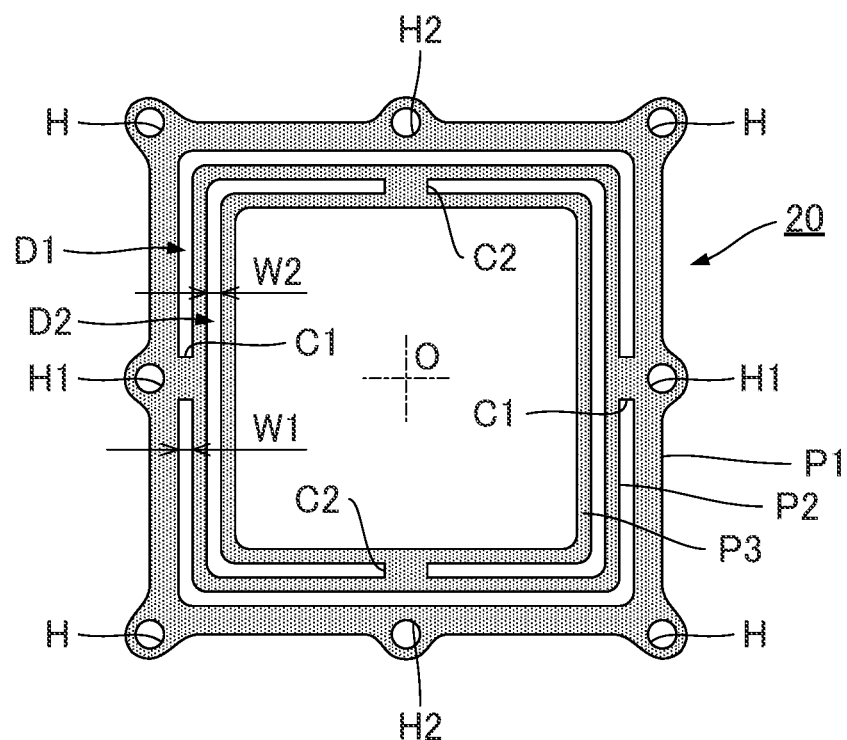
FIG. 10 is a plan view showing a gasket according to a fourth embodiment.

FIG. 10 is a plan view showing a gasket 20 according to a fourth embodiment. As shown in FIG. 10, the gasket 20 according to the fourth embodiment includes, as in the first embodiment, the first loop-shaped portion P1, the second loop-shaped portion P2, the third loop-shaped portion P3, the plurality of first connector portions C1, and the plurality of second connector portions C2. The planar shape of each loop-shaped portion P is a shape of a rectangular (for example, square) loop as in the third embodiment. The second loop-shaped portion P2 is positioned at a radially inner side of the first loop-shaped portion P1 across the first gap D1, and the third loop-shaped portion P3 is positioned at a radially inner side of the second loop-shaped portion P2 across the second gap D2. Each first connector C1 connects the first loop-shaped portion P1 and the second loop-shaped portion P2 in a part of the first gap D1, and each second connector portion C2 connects the second loop-shaped portion P2 and the third loop-shaped portion P3 in a part of the second gap D2. As described above, also in the fourth embodiment, since infiltration of liquid is delayed by the first gap D1 and the second gap D2, it is possible to reduce the infiltration of the liquid into the sealing structure 100 as in the first embodiment.

Furthermore, in the fourth embodiment, the position (or the position in the direction along the shape of the gasket 20) of the first connector portion C1 in the circumferential direction is different from the position of the second connector portion C2 in the circumferential direction, as in the second embodiment. Furthermore, each loop-shaped portion P and each connector portion C are both constituted by a lamination layer of the base portion 21, the first elastic layer 22, and the second elastic layer 23, as in the second embodiment. Therefore, each connector portion C is as thick as each loop-shaped portion P.

As in the third embodiment, a fastener of the plurality of fasteners 12 is inserted into each hole of the plurality of through holes, the plurality of through holes formed in the first loop-shaped portion P1 according to the fourth embodiment. In FIG. 10, a reference sign H1 is allocated to two through holes H selected from the plurality of through holes H, and a reference sign H2 is allocated to the other two through holes H.

As in the third embodiment, each of the first connector portion C1 and the second connector portion C2 is formed in the vicinity of the through hole H. Specifically, the first connector portion C1 is formed to include the nearest point to one through hole H1 in the first gap D1. In other words, the first connector portion C1 is formed between the through hole H1 and the central axis O in the first gap D1. Similarly, the second connector portion C2 is formed to include the nearest point to one through hole H2 in the second gap D2. In other words, the second connector portion C2 is formed between the through hole H2 and the central axis O in the second gap D2.

In the configuration in which each connector C is as thick as each loop-shaped portion P as in the fourth embodiment, the first recess R1 and the second recess R2 described in the first embodiment are not formed. Therefore, liquid infiltrating from the outside of the sealing structure 100 may infiltrate in the radial direction forward inside along the first connector portion C1 or the second connector portion C2. In the fourth embodiment, since infiltration of liquid is reduced by installing each of the first connector portion C1 and the second connector portion C2 in the vicinity of the through hole H, the effect is particularly significant in that infiltration of the liquid into the sealing structure 100 can be reduced over a long period of time.

Fifth Embodiment

Figure 11:
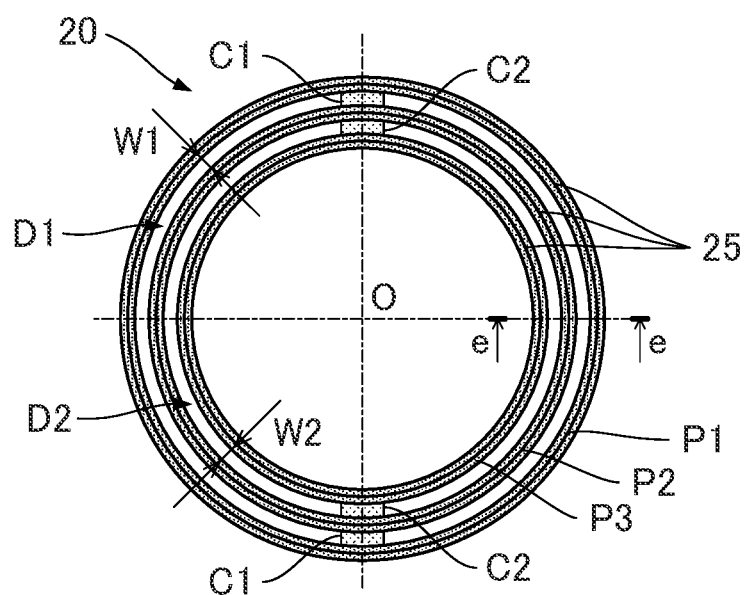
FIG. 11 is a plan view showing a gasket according to a fifth embodiment.
Figure 12:
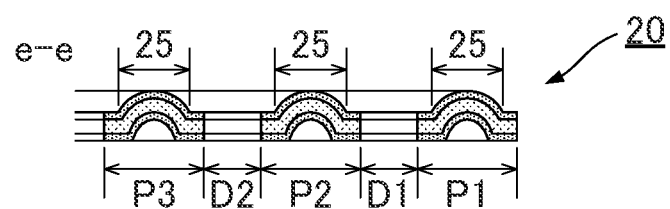
FIG. 12 is a cross-sectional view along a line e-e in FIG. 11.

FIG. 11 is a plan view showing a gasket 20 according to a fifth embodiment. FIG. 12 is a cross-sectional view along a line e-e in FIG. 11. As shown in FIG. 11 and FIG. 12, a protrusion 25 is formed in each loop-shaped portion P (P1, P2, P3). As will be understood from FIG. 12, the protrusion 25 is a full bead protruding from a surface of each loop-shaped portion P. The surface of each loop-shaped portion P faces the end face E1 of the first housing 10a (or the end face E2 of the second housing 10b). The protrusion 25 extends in the circumferential direction in planar view. Specifically, the protrusion 25 is formed in a shape of a loop over the entire circumference of the gasket 20 in planar view. In other words, the protrusion 25 extends along the loop-shaped portion P.

Also in the fifth embodiment, effects identical to those in the first embodiment are realized. Furthermore, in the fifth embodiment, since the protrusion 25 of each loop-shaped portion P is in surface-contact to the end face E1 of the first housing 10a, it is possible to reduce the infiltration of liquid from between the end face E1 and the gasket 20.

In FIG. 11, such a configuration is shown in which the protrusion 25 is added to the first embodiment in which the first elastic layer 22 and the second elastic layer 23 are not formed in each connector portion C. However, the protrusion 25 according to the fifth embodiment may be added to the second embodiment in which the first elastic layer 22 and the second elastic layer 23 are formed in each connector portion C. Furthermore, the protrusion 25 according to the fifth embodiment may be added to the configuration in which the planar shape of each loop-shaped portion P is in a shape of a rectangular loop as in the third embodiment or the fourth embodiment.

Sixth Embodiment

Figure 13:
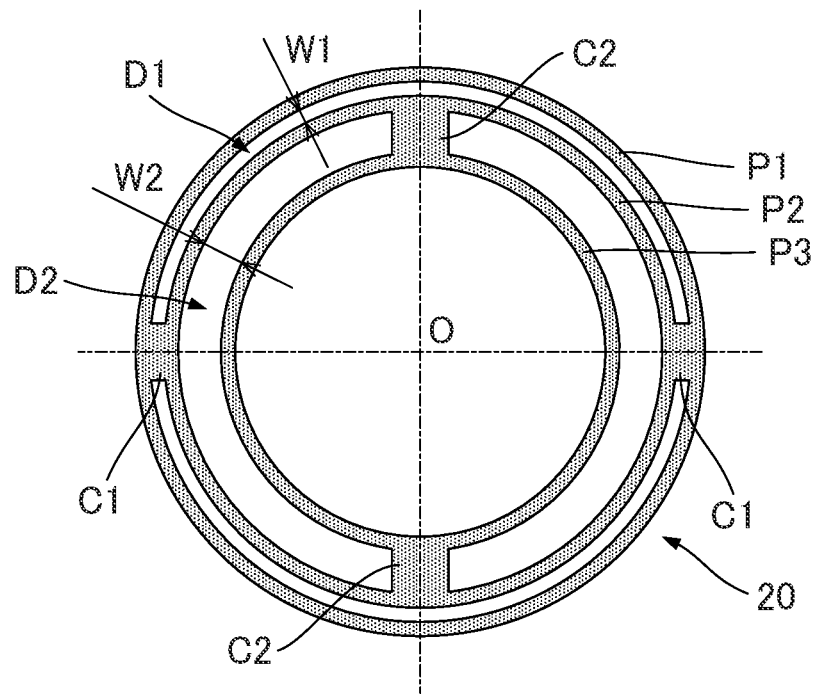
FIG. 13 is a plan view of a gasket according to a sixth embodiment.

FIG. 13 is a plan view showing a gasket 20 according to a sixth embodiment. The gasket 20 according to the sixth embodiment includes the first loop-shaped portion P1, the second loop-shaped portion P2, the third loop-shaped portion P3, the plurality of first connector portions C1, and the plurality of second connector portions C2, as in the second embodiment. As in the second embodiment, the position of the first connector portion C1 in the circumferential direction is different from the position of the second connector portion C2 in the circumferential direction. Furthermore, each loop-shaped portion P and each connector portion C are both constituted by a lamination layer of the base portion 21, the first elastic layer 22, and the second elastic layer 23, as in the second embodiment.

As shown in FIG. 13, in the sixth embodiment, the width W1 of the first gap D1 is different from the width W2 of the second gap D2 (W1≠W2). Specifically, the width W2 of the second gap D2 positioned in an inner peripheral side is greater than the width W1 of the first gap D1 positioned in an outer peripheral side (W2>W1).

Also in the sixth embodiment, effects identical to those of the first embodiment are realized. Furthermore, in the sixth embodiment, since the width W2 of the second gap D2 is greater than the width W1 of the first gap D1, a volume sufficient for accumulating liquid is ensured in the second gap D2. Therefore, a period from a time when liquid starts to infiltrate the second gap D2 until a time when the liquid fills the gap D2 is sufficiently ensured. In other words, the above-described effect is particularly significant in that infiltration of liquid into the sealing structure 100 can be reduced over a long period of time.

Figure 14:
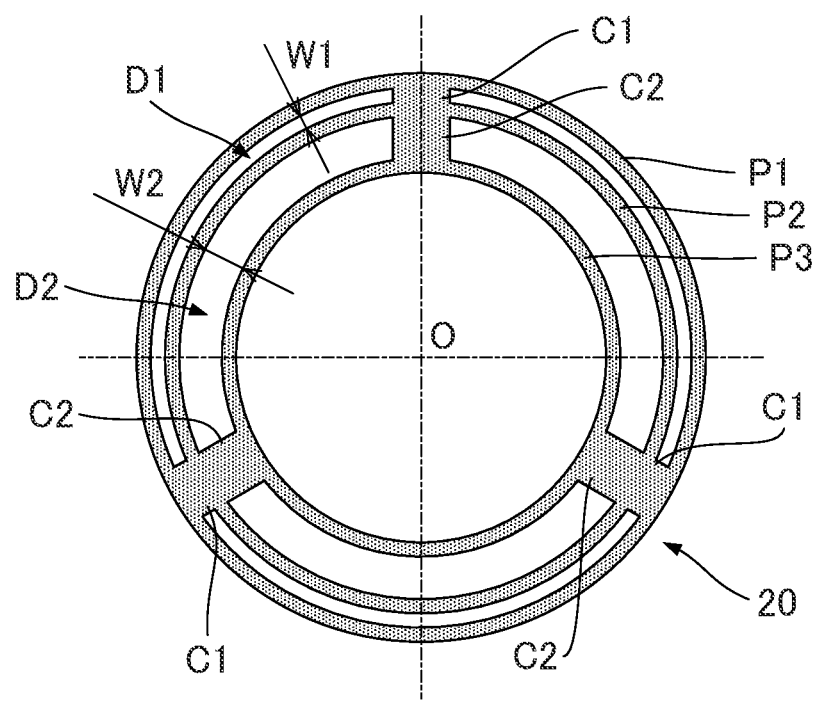
FIG. 14 is a plan view showing a gasket according to a modification of the sixth embodiment.
Figure 15:
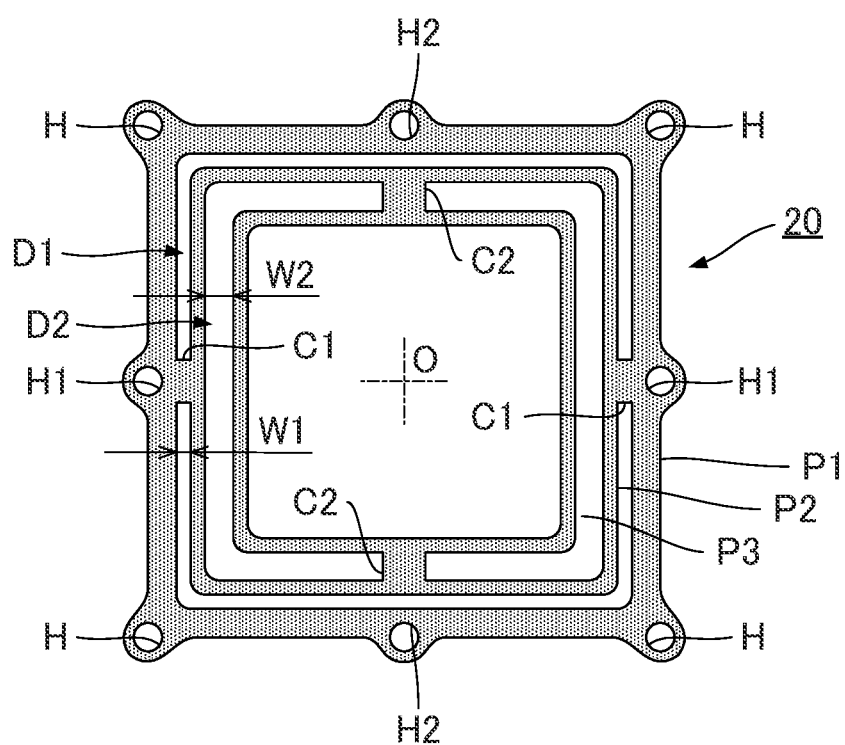
FIG. 15 is a plan view showing the gasket according to the modification of the sixth embodiment.

As shown in FIG. 14, in the gasket 20 in which the position of the first connector portion C1 in the circumferential direction is identical to the position of the second connector portion C2 in the circumferential direction, such a configuration in which the width W2 of the second gap D2 is greater than the width W1 of the first gap D1 may be adopted, as shown in FIG. 13. Furthermore, as shown in FIG. 15, in the gasket 20 according to the third embodiment or the fourth embodiment in which the planar shape of each loop-shaped portion P is a shape of a rectangular loop, a configuration in which the width W2 of the second gap D2 is greater than the width W1 of the first gap D1 may be adopted.

In the above explanations, a configuration in which the width W2 of the second gap D2 is greater than the width W1 of the first gap D1 is shown. However, a configuration in which the width W1 of the first gap D1 is greater than the width W2 of the second gap D2 (W1>W2) may also be assumed.

Seventh Embodiment

Figure 16:
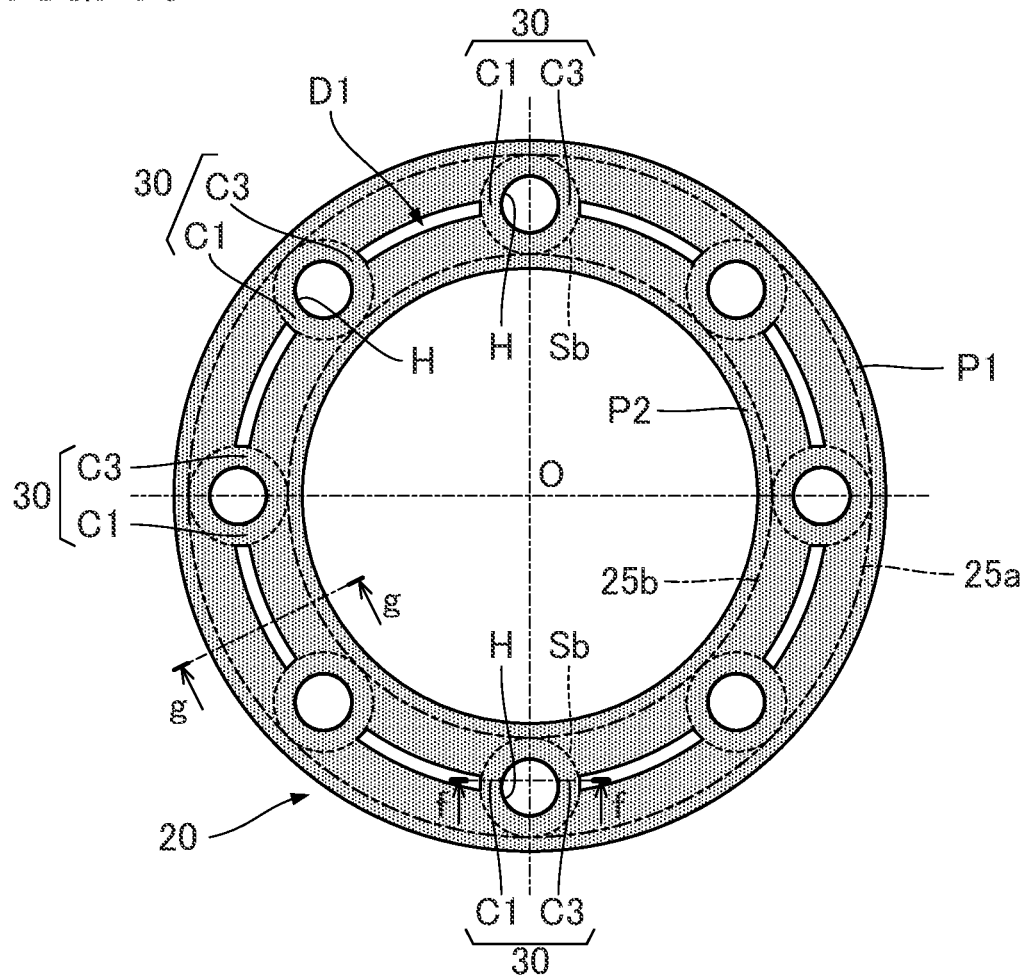
FIG. 16 is a plan view showing a gasket according to a seventh embodiment.

FIG. 16 is a plan view showing a gasket 20 according to a seventh embodiment. The gasket 20 according to the seventh embodiment includes the first loop-shaped portion P1, the second loop-shaped portion P2, the plurality of first connector portions C1, and a plurality of third connector portions C3. Each loop-shaped portion P (P1, P2) and each connector portion C (C1, C3) are both constituted by a lamination layer of the base portion 21, the first elastic layer 22, and the second elastic layer 23. In each cross-sectional view (FIG. 17 to FIG. 25) to be referred to in the following descriptions, illustration of a laminated structure of the gasket 20 is omitted for convenience.

Each of the first loop-shaped portion P1 and the second loop-shaped portion P2 is a loop-shaped portion formed in a shape of a circle in planar view. The second loop-shaped portion P2 is positioned at a radially inner side of the first loop-shaped portion P1 with the first gap D1 being between the first loop-shaped portion P1 and the second loop-shaped portion P2. The width of the first loop-shaped portion P1 is identical to the width of the second loop-shaped portion P2. Therefore, the first gap D1 is positioned at the center in the width direction of the gasket 20.

Each of the first connector portions C1 connects the first loop-shaped portion P1 and the second loop-shaped portion P2 in a part of the first gap D1. Similarly, each of the third connector portions C3 connects the first loop-shaped portion P1 and the second loop-shaped portion P2 in a part of the first gap D1. A set of one first connector portion C1 and one third connector portion C3 adjacent to each other across a space in the circumferential direction forms an attaching portion 30. As will be understood from FIG. 16, a plurality of attaching portions 30 are formed at regular intervals along the circumferential direction.

A space between the first connector portion C1 and the third connector portion C3 constituting each attaching portion 30 is a through hole H. The through hole H is a circular opening into which the fastener 12 is inserted, as described above. As will be understood from the above explanations, a plurality of through holes H are formed at regular intervals along the circumferential direction. Each first gap D1 extends in the circumferential direction between the two attaching portions 30 adjacent to each other in the circumferential direction.

Figure 17:
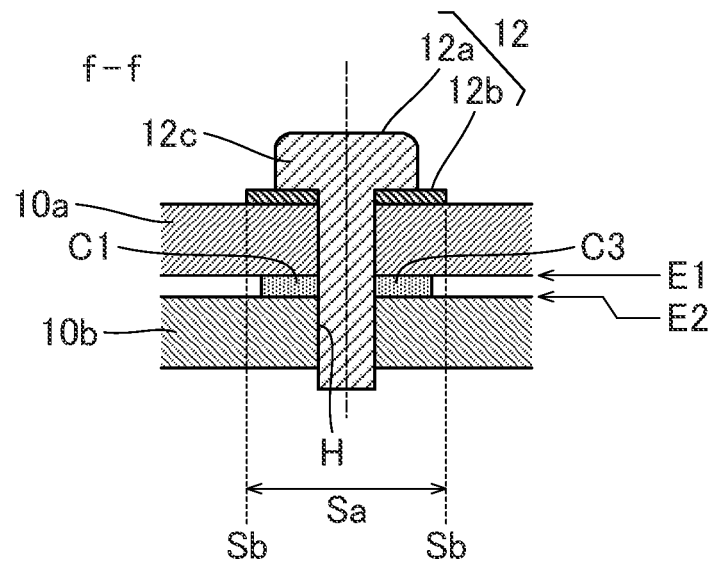
FIG. 17 is a cross-sectional view along a line f-f in FIG. 16.

FIG. 17 is a cross-sectional view showing a vicinity of the attaching portion 30 in a state in which the fastener 12 is inserted into the through hole H. FIG. 17 corresponds to a cross-sectional view along a line f-f in FIG. 16. A circular dashed line shown in FIG. 16 and FIG. 17 illustrates a perimeter edge Sb of a bearing surface Sa in the fastener 12. FIG. 17 illustrates a bolt 12a and a washer 12b as the fastener 12. The bolt 12a is inserted into the through hole H. The washer 12b is a loop-shaped plate-like portion positioned between a head 12c of the bolt 12a and a surface of the first housing 10a. In the configuration described above, the perimeter edge Sb of the washer 12b corresponds to the perimeter edge Sb of the bearing surface Sa in the fastener 12. In a configuration in which the washer 12b is omitted, a perimeter edge of a bottom surface (that is, the bearing surface) in the head 12c of the bolt 12a corresponds to the perimeter edge Sb of the bearing surface Sa.

As will be understood from FIG. 16 and FIG. 17, the attaching portion 30 is positioned at a radially inner side of the perimeter edge Sb on the bearing surface Sa of the fastener 12 in planar view seen from the direction of the central axis O. Specifically, the first connector portion C1 and the third connector portion C3 are positioned at a radially inner side of the perimeter edge Sb of the fastener 12 to be inserted into the through hole H between the first connector portion C1 and the third connector portion C3 in planar view. In other words, the first connector C1 and the third connector portion C3 overlap with the bearing surface Sa of the fastener 12 in planar view.

As described in the third embodiment, since the first housing 10a and the second housing 10b are firmly fastened by the fastener 12 in the vicinity of the fastener 12, the gasket 20 is sufficiently compressed. Therefore, liquid barely infiltrates in the vicinity of the through hole H in the gasket 20 as compared with other parts of the gasket 20, and as a result, there is a tendency for corrosion of the housing 10 to be reduced. In the seventh embodiment, since the fastener 12 is inserted into the through hole H formed by the first connector portion C1 and the third connector portion C3, the probability is reduced of liquid infiltrating into the housing 10 from the vicinity of the attaching portion 30. Therefore, the effect is particularly significant in that infiltration of liquid into the sealing structure 100 can be reduced over a long period of time. Particularly in the seventh embodiment, since the first connector portion C1 and the third connector portion C3 are positioned at a radially inner side of the perimeter edge Sb in the bearing surface Sa of the fastener 12, the effect of reducing the probability that liquid will infiltrate into the housing 10 from the vicinity of the attaching portion 30 is particularly significant.

Figure 18:
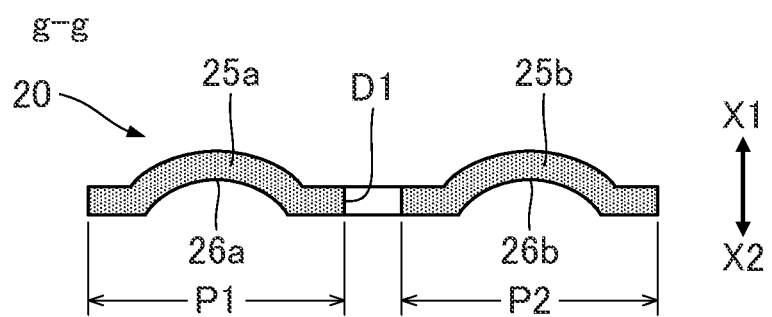
FIG. 18 is a cross-sectional view along a line g-g in FIG. 16.

FIG. 18 is a cross-sectional view along a line g-g in FIG. 16. As shown in FIG. 18, the gasket 20 according to the seventh embodiment includes a first protrusion 25a and a second protrusion 25b. In FIG. 16, each ridge line of the first protrusion 25a and the second protrusion 25b is shown by a dash chain line. In the following descriptions, as shown in FIG. 18, one direction along the central axis O is denoted as the "X1 direction", and the other direction is denoted as the "X2 direction". The first housing 10a is positioned in the X1 direction when seen from the gasket 20, and the second housing 10b is positioned in the X2 direction when seen from the gasket 20.

The first protrusion 25a is a full bead formed in the first loop-shaped portion P1 and extending in a shape of a loop along the shape of the first loop-shaped portion P1. The first protrusion 25a according to the seventh embodiment protrudes in the X1 direction. Specifically, the first protrusion 25a protrudes in the X1 direction from a surface of the first loop-shaped portion P1 facing the end face E1 of the first housing 10a toward the first housing 10a. On the other hand, a loop-shaped groove 26a (a recess) corresponding to the first protrusion 25a is formed on a surface of the first loop-shaped portion P1 facing the second housing 10b.

Similarly, the second protrusion 25b is a full bead formed in the second loop-shaped portion P2 and extending in a shape of a loop along the shape of the second loop-shaped portion P2. The second protrusion 25b according to the eighth embodiment protrudes in the X1 direction. Specifically, the second protrusion 25b protrudes in the X1 direction from a surface of the second loop-shaped portion P2 facing the end face E1 of the first housing 10a toward the first housing 10a. On the other hand, a loop-shaped groove 26b (a recess) corresponding to the second protrusion 25b is formed on a surface of the second loop-shaped portion P2 facing the second housing 10b.

As will be understood from the above explanations, the first protrusion 25a is formed between the first gap D1 and the edge of the outer periphery of the gasket 20, and the second protrusion 25b is formed between the first gap D1 and the edge of the inner periphery of the gasket 20. The first protrusion 25a and the second protrusion 25b according to the seventh embodiment each protrude in the same direction (the X1 direction).

Also in the seventh embodiment, effects identical to those of the first embodiment are realized. Furthermore, in the seventh embodiment, since the first protrusion 25a and the second protrusion 25b are in surface contact with the end face E1 of the first housing 10a, infiltration of liquid between the end face E1 and the gasket 20 can be effectively reduced.

Figure 19:
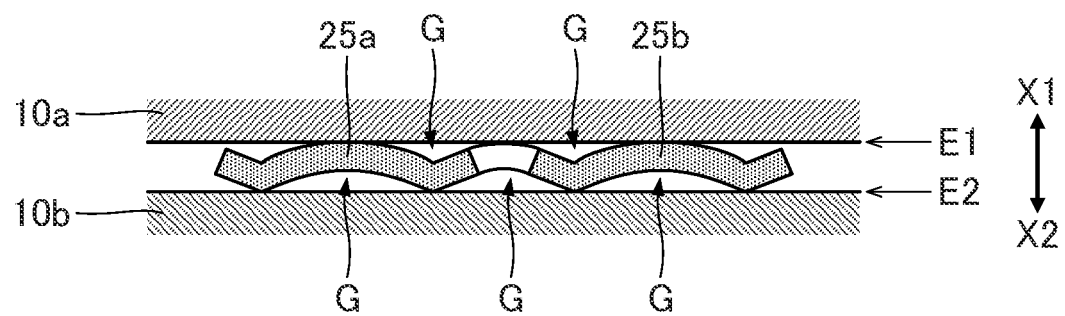
FIG. 19 is a cross-sectional view showing the gasket in a state of use.

FIG. 19 is a cross-sectional view showing the gasket 20 in a state in which the gasket 20 is placed between the first housing 10a and the second housing 10b (that is, in a state of use). As shown in FIG. 19, in the state of use, a plurality of loop-shaped gaps G are formed between the gasket 20 and the end face E1 of the first housing 10a or the end face E2 of the second housing 10b. In the configuration described above, liquid infiltrating from the outside of the sealing structure 100 also accumulates in the gaps G in addition to the first gap D1. Therefore, according to the seventh embodiment, infiltration of liquid into the sealing structure 100 can be reduced over a long period of time as compared with a configuration in which the gasket 20 is a flat member having no unevenness.

Eighth Embodiment

A gasket 20 according to an eighth embodiment includes the first loop-shaped member P1, the second loop-shaped member P2, the plurality of first connector portions C1, and the plurality of third connector portions C3, as in the seventh embodiment shown in FIG. 16. Each loop-shaped member P (P1, P2) and each connector portion C (C1, C3) are both constituted by a lamination layer of the base portion 21, the first elastic layer 22, and the second elastic layer 23. The configuration in which the attaching portion 30 is positioned at a radially inner side of the perimeter edge Sb in the bearing surface Sa of the fastener 12 is identical to that of the seventh embodiment.

Figure 20:
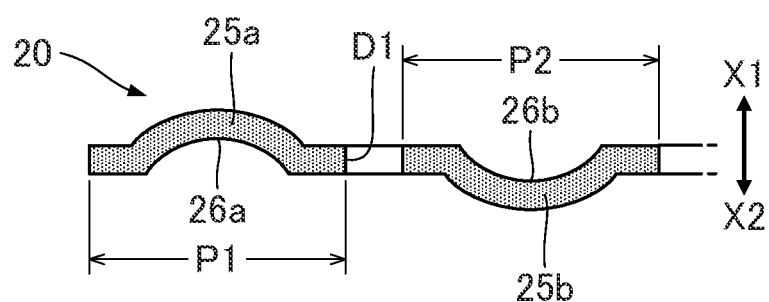
FIG. 20 is a cross-sectional view showing a gasket according to an eighth embodiment.

FIG. 20 is a cross-sectional view showing the gasket 20 according to the eighth embodiment. FIG. 20 illustrates a cross section corresponding to FIG. 18 that is referred to in the seventh embodiment. As shown in FIG. 20, in the eighth embodiment, the loop-shaped first protrusion 25a is formed in the first loop-shaped member P1, and the loop-shaped second protrusion 25b is formed in the second loop-shaped member P2, as in the seventh embodiment.

The first protrusion 25a is a loop-shaped full bead protruding in the X1 direction as in the seventh embodiment. Specifically, the first protrusion 25a protrudes in the X1 direction from a surface of the first loop-shaped member P1 facing the end face E1 of the first housing 10a toward the first housing 10a. The loop-shaped groove 26a corresponding to the first protrusion 25a is formed on a surface of the first loop-shaped member P1 facing the second housing 10b.

On the other hand, the second protrusion 25b is a loop-shaped full bead protruding in the X2 direction opposite to the X1 direction. Specifically, the second protrusion 25b protrudes from a surface of the second loop-shaped member P2 facing the end face E2 of the second housing 10b toward the second housing 10b. The loop-shaped groove 26b corresponding to the second protrusion 25b is formed on a surface of the second loop-shaped member P2 facing the first housing 10a. As indicated above, in the eighth embodiment, the direction of protrusion of the first protrusion 25a is opposite to the direction of protrusion of the second protrusion 25b.

Figure 21:
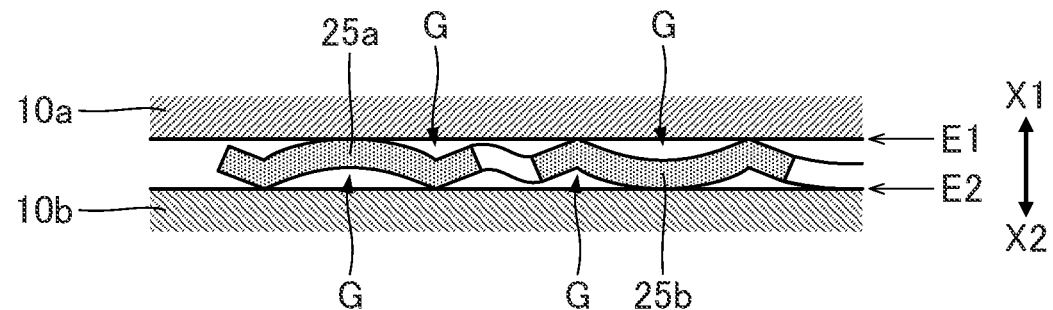
FIG. 21 is a cross-sectional view showing the gasket in a state of use.

Also in the eighth embodiment, effects identical to those of the seventh embodiment are realized. FIG. 21 is a cross-sectional view showing the gasket 20 in a state of use. As shown in FIG. 21, a loop-shaped gap G is formed between the gasket 20 and the end face E1 of the first housing 10a or the end face E2 of the second housing 10b. In the configuration described above, liquid infiltrating from the outside of the sealing structure 100 accumulates also in the gaps G in addition to the first gap D1. Therefore, according to the eighth embodiment, infiltration of liquid into the sealing structure 100 can be reduced over a long period of time as in the seventh embodiment, as compared with a configuration in which the gasket 20 is a flat member having no unevenness.

In the configuration in which the first protrusion 25a and the second protrusion 25b protrude in the same direction as in the seventh embodiment, warping may occur between the edge of the inner periphery of the gasket 20 and the edge of the outer periphery thereof. According to the seventh embodiment, since the first protrusion 25a and the second protrusion 25b protrude in directions opposite to each other, an effect is obtained in that warping of the gasket 20 can be reduced compared to the seventh embodiment.

Ninth Embodiment

A gasket 20 according to a ninth embodiment includes the first loop-shaped portion P1, the second loop-shaped portion P2, the plurality of first connector portions C1, and the plurality of third connector portions C3, as in the seventh embodiment shown in FIG. 16. Each loop-shaped portion P (P1, P2) and each connector portion C (C1, C3) are both constituted by a lamination layer of the base portion 21, the first elastic layer 22, and the second elastic layer 23. The configuration in which the attaching portion 30 is positioned at a radially inner side of the perimeter edge Sb in the bearing surface Sa of the fastener 12 is identical to that in the seventh embodiment.

Figure 22:
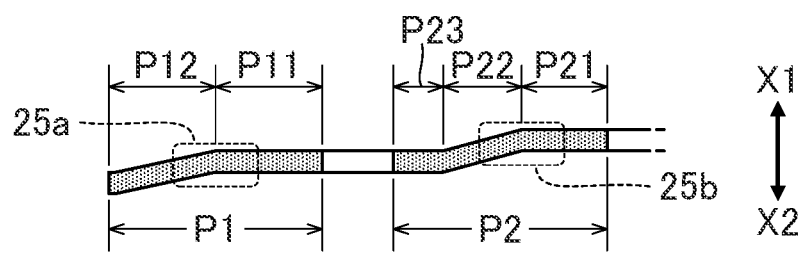
FIG. 22 is a cross-sectional view showing a gasket according to a ninth embodiment.

FIG. 22 is a cross-sectional view showing the gasket 20 according to the ninth embodiment. FIG. 22 illustrates a cross section corresponding to FIG. 18 that is referred to in the seventh embodiment. As shown in FIG. 22, in the ninth embodiment, the loop-shaped first protrusion 25a is formed in the first loop-shaped portion P1, and the loop-shaped second protrusion 25b is formed in the second loop-shaped portion P2, as in the seventh embodiment.

The first protrusion 25a is a bent bead protruding in the X1 direction toward the first housing 10a. As shown in FIG. 22, the first loop-shaped portion P1 includes a flat part P11 and an inclined part P12. The flat part P11 is a loop-shaped portion, and the inclined part P12 is a loop-shaped portion continuous to an edge of an outer periphery of the flat part P11. The flat part P11 is a tabular portion parallel to a plane vertical to the central axis O (hereinafter, "reference plane"). The inclined part P12 is a tabular portion inclining to the reference plane. Specifically, the inclined part P12 inclines to the reference plane so that an edge of an inner periphery thereof is away from an edge of an outer periphery thereof in the X1 direction. The vicinity of a boundary between the flat part P11 and the inclined part P12 functions as the first protrusion 25a.

The second protrusion 25b is a half bead protruding in the X1 direction toward the first housing 10a. As shown in FIG. 22, the second loop-shaped portion P2 includes a flat part P21, an inclined part P22, and a flat part P23. The flat part P21 is a loop-shaped portion. The flat part P23 is a loop-shaped portion surrounding the flat part P21. The inclined part P22 is a loop-shaped portion connecting the flat part P21 and the flat part P23.

The flat part P21 and the flat part P23 are tabular portions parallel to the reference plane. The inclined part P22 is a tabular portion inclining to the reference plane. Specifically, the inclined part P22 inclines to the reference plane so that an edge of an inner periphery thereof is away from an edge of an outer periphery thereof in the X1 direction. In other words, the flat part P21 is away from the flat part P23 in the X1 direction. The vicinity of a boundary between the flat part P21 and the inclined part P22 functions as the second protrusion 25b.

Also in the ninth embodiment, effects identical to those of the first embodiment are realized. Furthermore, in the ninth embodiment, since the first protrusion 25a and the second protrusion 25b are in surface contact with the end face E1 of the first housing 10a, it is possible to effectively reduce infiltration of liquid from between the end face E1 and the gasket 20 as in the seventh embodiment.

Figure 23:
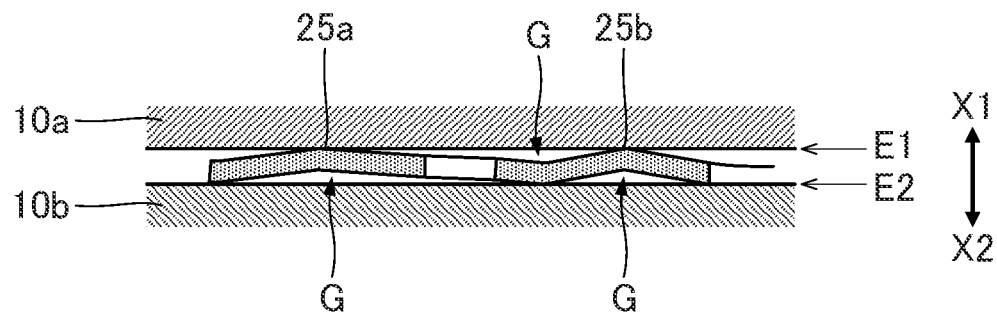
FIG. 23 is a cross-sectional view showing the gasket in a state of use.

FIG. 23 is a cross-sectional view showing the gasket 20 in a state of use. As shown in FIG. 23, a plurality of loop-shaped gaps G are formed between the gasket 20 and the end face E1 of the first housing 10a or the end face E2 of the second housing 10b. In the configuration described above, liquid infiltrating from the outside of the sealing structure 100 also accumulates in the gaps G in addition to the first gap D1. Therefore, according to the ninth embodiment, it is possible to reduce infiltration of liquid into the sealing structure 100 over a long period of time, as in the seventh embodiment, as compared with a configuration in which the gasket 20 is a flat member having no unevenness.

Tenth Embodiment

Figure 24:
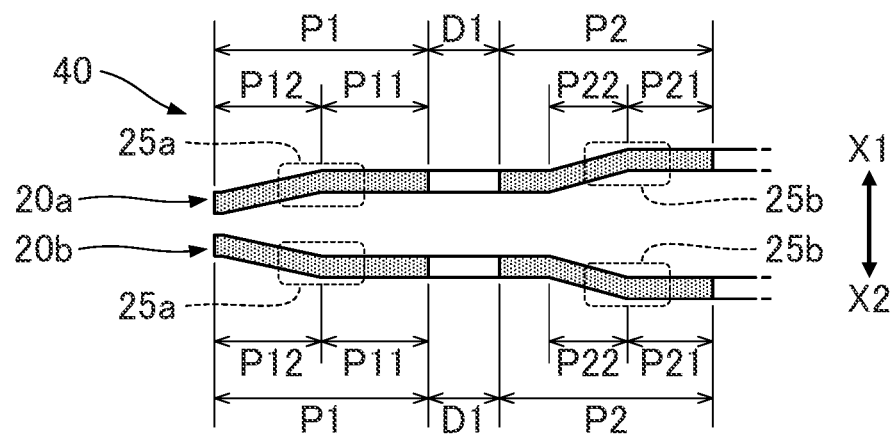
FIG. 24 is a cross-sectional view showing a gasket according to a tenth embodiment.

FIG. 24 is a cross-sectional view illustrating a configuration of a gasket 40 according to a tenth embodiment. FIG. 24 illustrates a cross section corresponding to FIG. 18 that is referred to in the seventh embodiment. The gasket 40 according to the tenth embodiment includes a gasket 20a and a gasket 20b. Each structure of the gasket 20a and the gasket 20b is the same as that shown in the ninth embodiment. The gasket 20a and the gasket 20b are stacked so that the gasket 20a is away from the gasket 20b in the X1 direction.

Figure 25:
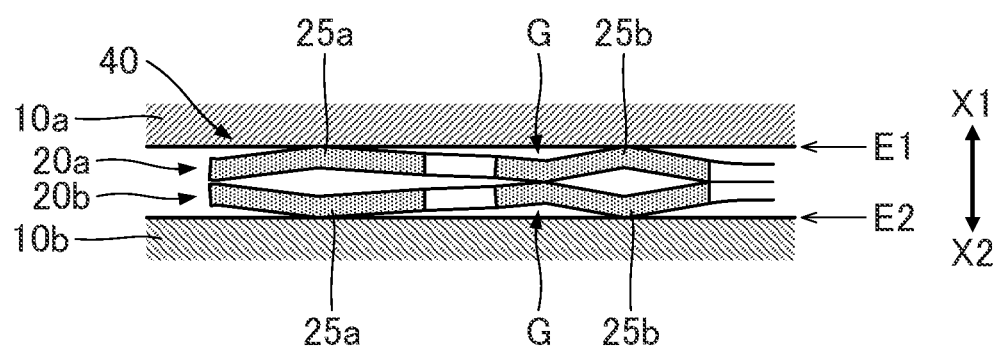
FIG. 25 is a cross-sectional view showing the gasket in a state of use.

FIG. 25 is a cross-sectional view showing the gasket 40 in a state of use. The gasket 20a is positioned between the gasket 20b and the first housing 10a, and the gasket 20b is positioned between the gasket 20a and the second housing 10b. As shown in FIG. 25, the gasket 20a and the gasket 20b are stacked so that the first protrusion 25a and the second protrusion 25b in the gasket 20a are in contact with the end face E1 of the first housing 10a in a situation in which the first protrusion 25a and the second protrusion 25b in the gasket 20b are in contact with the end face E2 of the second housing 10b. In the configuration described above, a plurality of loop-shaped gaps G are formed between the gasket 20a and the end face E1 of the first housing 10a, and a plurality of loop-shaped gaps G are formed between the gasket 20b and the end face E2 of the second housing 10b. Accordingly, it is possible to reduce infiltration of liquid into the sealing structure 100 over a long period of time, as in the seventh embodiment.

Eleventh Embodiment

Figure 26:
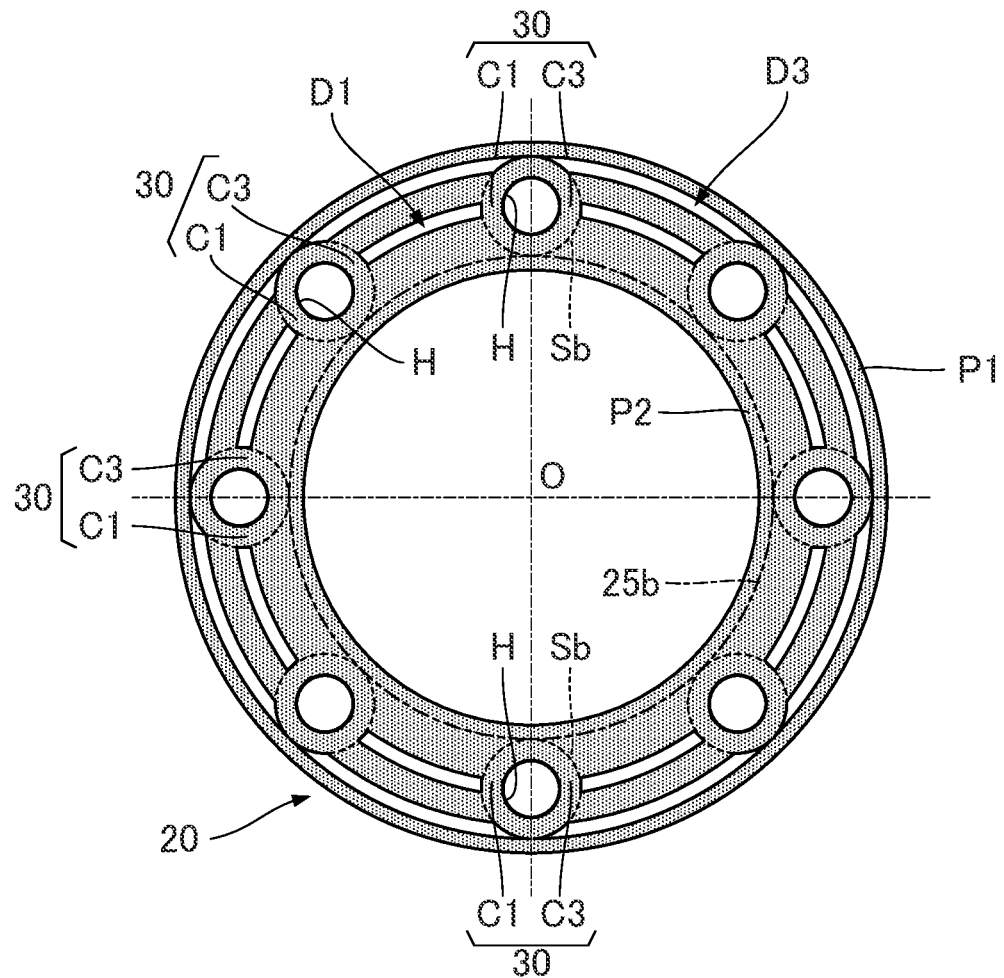
FIG. 26 is a plan view showing a gasket according to an eleventh embodiment.

FIG. 26 is a plan view showing a gasket 20 according to an eleventh embodiment. The gasket 20 according to the eleventh embodiment has a configuration in which a third gap D3 is formed instead of the first protrusion 25a in the gasket 20 according to the seventh embodiment shown in FIG. 16. The third gap D3 is an arc-like space extending in the circumferential direction. The first gap D1 and the third gap D3 are formed between two through holes H adjacent to each other in the circumferential direction.

The second protrusion 25b is formed in the second loop-shaped portion P2 as in the seventh embodiment. The second protrusion 25b is formed in a shape of a loop along an edge of an inner periphery of the gasket 20. The first gap D1 is formed between the second protrusion 25b and an edge of an outer periphery of the gasket 20 and the third gap D3 is formed between the first gap D1 and the edge of the outer periphery thereof. In other words, the second protrusion 25b is positioned in an area on an inner peripheral side of the first gap D1, and the third gap D3 is formed in an area on an outer peripheral side of the first gap D1. In other words, the first gap D1 is positioned between the second protrusion 25b and the third gap D3.

According to the configuration described above, it is possible to reduce infiltration of liquid by the first gap D1 and the third gap D3, furthermore, it is possible to reduce infiltration of the liquid also by the configuration in which the second protrusion 25b is in surface contact with the end face E1 of the first housing 10a. Therefore, accordingly, the effect is particularly significant in that infiltration of liquid into the sealing structure 100 can be reduced over a long period of time.

Twelfth Embodiment

Figure 27:
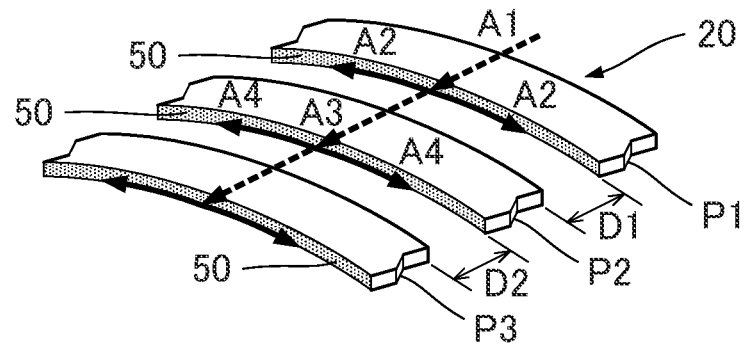
FIG. 27 is a partial perspective view showing a gasket according to a twelfth embodiment.

FIG. 27 is a partial perspective view showing a gasket 20 in a twelfth embodiment. The gasket 20 in the twelfth embodiment includes the first loop-shaped portion P1, the second loop-shaped portion P2, and the third loop-shaped portion P3 as in the first embodiment.

As shown in FIG. 27, a hydrophilic film 50 that covers an inner peripheral surface of each loop-shaped portion P is formed on the inner peripheral surface. The hydrophilic film 50 is a thin film having hydrophilic property (wettability) to liquid infiltrating into the sealing structure 100. The hydrophilic property of the hydrophilic film 50 is higher than the hydrophilic property of the inner peripheral surface of the loop-shaped portion P. For formation of the hydrophilic film 50, a freely selected, known material having hydrophilic property is used.

Also in the twelfth embodiment, effects identical to those of the first embodiment are realized. Furthermore, in the twelfth embodiment, since the hydrophilic film 50 is formed on the inner peripheral surface of the loop-shaped portion P, liquid having reached the first gap D1 is promoted in infiltrating in a direction of arrow A2 along the inner peripheral surface of the first loop-shaped portion P1. Furthermore, liquid having reached the second gap D2 is promoted in infiltrating in a direction of arrow A4 along the inner peripheral surface of the second loop-shaped portion P2. In other words, infiltration of liquid into the housing 10 can be delayed. Therefore, according to the twelfth embodiment, it is possible to reduce infiltration of liquid into the sealing structure 100 over a long period of time.

In FIG. 27, a configuration in which the hydrophilic film 50 is formed on each of the inner peripheral surfaces of all the loop-shaped portions P is shown. However, the hydrophilic film 50 may be formed only on the inner peripheral surface of a part of the loop-shaped portions P. For example, in the configuration in which the first loop-shaped portion P1, the second loop-shaped portion P2, and the third loop-shaped portion P3 are provided as in the first embodiment, such a configuration may also be assumed in which the hydrophilic film 50 is formed on each of the inner peripheral surfaces of the first loop-shaped portion P1 and the second loop-shaped portion P2, and the hydrophilic film 50 is not formed on the inner peripheral surface of the third loop-shaped portion P3. Furthermore, in the configuration in which the first loop-shaped portion P1 and the second loop-shaped portion P2 are provided as in the seventh embodiment, such a configuration may also be assumed in which the hydrophilic film 50 is formed on the inner peripheral surface of the first loop-shaped portion P1 and the hydrophilic film 50 is not formed on the inner peripheral surface of the second loop-shaped portion P2.

FIG. 27 illustrates the configuration in which the hydrophilic film 50 is formed on the inner peripheral surface of each loop-shaped portion P. However, a configuration in which the hydrophilic film 50 is formed on the outer peripheral surface of each loop-shaped portion P, or a configuration in which the hydrophilic film 50 is formed on both the inner peripheral surface and the outer peripheral surface of each loop-shaped portion P may also be assumed. In other words, the hydrophilic film 50 is formed on an inner wall surface of the first gap D1 or the second gap D2.

Modifications

Each of the embodiments illustrated above may be variously modified. Specific modified modes that may be applied to each of the embodiments described above are illustrated below. Two or more aspects freely selected from the following descriptions may be combined as appropriate as long as there is no conflict.

(1) In the respective embodiments described above, the gasket 20 including three loop-shaped portions P (P1, P2, P3) is shown. However, the number of loop-shaped portions P constituting the gasket 20 is not limited to three. A configuration in which the gasket 20 includes two loop-shaped portions P (P1, P2), for example, as shown in the sixth embodiment to the eleventh embodiment, or a configuration in which the gasket 20 includes four or more loop-shaped portions P may also be assumed. Therefore, the number of gaps D (D1, D2) is not limited to the illustrations (two positions) in each embodiment described above. A configuration in which only one gap D is formed in the gasket 20, for example, as shown in the sixth embodiment to the eleventh embodiment, or a configuration in which three or more gaps D are formed in the gasket 20 may also be assumed.

(2) In the respective embodiments described above, the gasket 20 including the two first connector portions C1 and the two second connector portions C2 is shown. However, the number of connector portions C constituting the gasket 20 is not limited to the illustration described above. For example, a configuration in which the gasket 20 includes only one first connector portion C1, or a configuration in which the gasket 20 includes three or more first connector portions C1 may also be assumed. Similarly, a configuration in which the gasket 20 includes only one second connector portion C2, or a configuration in which the gasket 20 includes three or more second connector portions C2 may also be assumed. The number of first connector portions C1 may be different from the number of second connector portions C2.

(3) In the respective embodiments described above, the loop-shaped portion P in a shape of a loop having a circular or rectangular planar shape is shown. However, the shape of the loop-shaped portion P is not limited to the illustrations described above. For example, a loop-shaped portion P having a planar shape such as an oval or a multiangular shape (polygonal, for example, a triangular shape or a hexagonal shape) may be assumed. Furthermore, each planar shape of the plurality of loop-shaped portions P may be different from each other. For example, such a configuration in which the planar shape of the first loop-shaped portion P1 is rectangular and the planar shape of the second loop-shaped portion P2 is circular may also be adopted.

(4) A dimensional relationship between the width of each loop-shaped portion P and the width of each gap D may be freely selected. For example, a configuration in which the width of the loop-shaped portion P is identical to the width of the gap D is assumed. Furthermore, a configuration in which the width of the loop-shaped portion P is greater than the width of the gap D, or a configuration in which the width of the loop-shaped portion P is less than the width of the gap D may also be adopted.

(5) In each of the embodiments described above, the gasket 20 constituted by a lamination layer of the base portion 21, the first elastic layer 22, and the second elastic layer 23 is shown. However, the cross-sectional structure of the gasket 20 is not limited thereto. For example, the gasket 20 having the shape according to each embodiment described above may be formed by a single layer, or the gasket 20 may be formed by a lamination layer of four or more layers. Furthermore, the first elastic layer 22 or the second elastic layer 23 may be omitted.

(6) The cross-sectional shape of the protrusion 25 of the fifth embodiment is not limited to the one shown in FIG. 12. For example, the protrusion 25 having an arc-like cross-sectional shape is shown in FIG. 12. However, a protrusion 25 having a trapezoidal cross-sectional shape may be formed. A protrusion 25 having a cross-sectional shape in a stepped form (half bead) may be formed. Furthermore, as disclosed in, for example, Japanese Patent Application Laid-Open Publication No. 2013-11300, a protrusion 25 having a shape corresponding to a blowhole that may be generated in the housing 10 may be formed.

(7) In the sixth embodiment to the ninth embodiment, the first connector portion C1 and the second connector portion C2 may be constituted by a single layer including only the base portion 21, as in the first embodiment or the third embodiment.

(8) The gasket 20 to be used in the sealing structure 100 in a vehicle such as an automobile has been shown. However, the field of using the gasket 20 is not limited to the above examples. For example, a gasket according to the present invention may be used in an industrial field such as connection of pipes.

The invention claimed is:

1. A sealing structure comprising:
a first housing including a first end face;
a second housing including a second end face; and
a gasket installed between the first end face and the second end face, wherein the gasket includes:
a first loop-shaped portion in a loop shape;
a second loop-shaped portion in a loop shape positioned at a radially inner side of the first loop-shaped portion, with a first gap between the first loop-shaped portion and the second loop-shaped portion; and
a first connector portion connecting the first loop-shaped portion and the second loop-shaped portion in a part of the first gap;
wherein the first gap is a space between the first end face and the second end face that is configured to store a fluid that has infiltrated between the first end face and the second end face; and
the first connector portion has an axial thickness that is thinner than an axial thickness of each of the first loop-shaped portion and the second loop-shaped portion to increase a volume of the first gap such that the first gap is configured to store a greater amount of fluid that has infiltrated between the first end face and the second end face.

2. The sealing structure according to claim 1, wherein each of the first loop-shaped portion and the second loop-shaped portion is a portion including a plate-like base portion made of metal, and an elastic layer that partly covers the base portion, and wherein the first connector portion is a portion that includes the base portion and does not include the elastic layer.

3. The sealing structure according to claim 1, wherein the first loop-shaped portion, the second loop-shaped portion, and the first connector portion each include a plate-like base portion made of metal and an elastic layer that covers the base.

4. The sealing structure according to claim 1, further comprising:
a third loop-shaped portion in a loop shape, disposed at a radially inner side of the second loop-shaped portion, with a second gap between the second loop-shaped portion and the third loop-shaped portion; and
a second connector portion that connects the second loop-shaped portion and the third loop-shaped portion in a part of the second gap.

5. The sealing structure according to claim 4, wherein the first connector portion and the second connector portion are positioned on a straight line, wherein the straight line is orthogonal to a central axis of the gasket.

6. The sealing structure according to claim 4, wherein the first connector portion is positioned on a first straight line,
the second connector portion is positioned on a second straight line,
each of the first straight line and the second straight line is orthogonal to a central axis of the gasket, and
the first straight line and the second straight line intersect with each other.

7. The sealing structure according to claim 4, wherein a width of the first gap is different from a width of the second gap.

8. The sealing structure according to claim 7, wherein the width of the second gap is greater than the width of the first gap.

9. The sealing structure according to claim 1,
wherein the first loop-shaped portion includes a through hole, and a fastener is inserted in the through hole,
wherein the fastener connects the first housing and the second housing, and
wherein the first connector portion is formed proximate the through hole.

10. The sealing structure according to claim 1, further comprising a third connector portion that connects the first loop-shaped portion and the second loop-shaped portion in a part of the first gap,
wherein a space between the first connector portion and the third connector portion is a through hole into which a fastener is inserted, the fastener connecting the first housing and the second housing.

11. The sealing structure according to claim 10, wherein the first connector portion and the third connector portion are positioned at an inner side of an outer peripheral edge of a bearing surface of the fastener in planar view.

12. The sealing structure according to claim 1, wherein there is formed a protrusion that protrudes toward the first housing on a surface of at least one of the first loop-shaped portion or the second loop-shaped portion, the surface facing the first housing.

13. The sealing structure according to claim 1,
wherein on a facing surface of the first loop-shaped portion facing the first housing, there is formed a first protrusion that protrudes toward the first housing along a shape of the first loop-shaped portion, and
wherein on a facing surface of the second loop-shaped portion facing the first housing, there is formed a second protrusion that protrudes toward the first housing along a shape of the second loop-shaped portion.

14. The sealing structure according to claim 1,
wherein on a facing surface of the first loop-shaped portion facing the first housing, there is formed a first protrusion that protrudes toward the first housing along a shape of the first loop-shaped portion, and
wherein on a facing surface of the second loop-shaped portion facing the second housing, there is formed a second protrusion that protrudes toward the second housing along a shape of the second loop-shaped portion.

15. The sealing structure according to claim 1, wherein a hydrophilic film is formed on an inner peripheral surface of at least one of the first loop-shaped portion or the second loop-shaped portion, the hydrophilic film covering the inner peripheral surface.

16. The sealing structure according to claim 1, further comprising:
a third loop-shaped portion in a loop shape positioned at a radially inner side of the second loop-shaped portion, with a second gap between the second loop-shaped portion and the third loop-shaped portion; and
a second connector portion connecting the second loop-shaped portion and the third loop-shaped portion in a part of the second gap;
wherein the second gap is a space between the first end face and the second end face that is configured to store a fluid that has infiltrated between the first end face and the second end face; and
the second connector portion is thinner than both the second loop-shaped portion and the third loop-shaped portion to increase a volume of the second gap such that the second gap is configured to store a greater amount of fluid that has infiltrated between the first end face and the second end face.

17. The sealing structure according to claim 16, wherein the first connector portion and the second connector portion are circumferentially and radially offset from each other.

18. The sealing structure according to claim 17, further comprising:
a third connector portion between the first loop-shaped portion and the second loop-shaped portion that is diametrically opposed to the first connector portion; and
a fourth connector portion between the second loop-shaped portion and the third loop-shaped portion that is diametrically opposed to the second connector portion,
wherein the third connector portion and the fourth connector portion are circumferentially and radially offset from each other such that a virtual line connecting the first connector portion and the third connector portion is arranged orthogonal to a virtual line connecting the second connector portion and the fourth connector portion.

19. A gasket configured to be located between a first end face of a first housing including and a second end face of a second housing, the gasket comprising:
a first ring;
a second ring located radially inward from the first ring such that a first gap is positioned between the first ring and the second ring;
a pair of first connector portions that connect the first ring to the second ring, the pair of first connector portions being diametrically opposed to one another;
a third ring located radially inward from the second ring such that a second gap is positioned between the second ring and the third ring; and
a pair of second connector portions that connect the second ring to the third ring, the pair of second connector portions being diametrically opposed to one another, wherein the pair of first connector portions are circumferentially and radially offset from pair of second connector portions, each of the first and second gaps are spaces between the first end face and the second end face that are each configured to store a fluid that has infiltrated between the first end face and the second end face, and the pair of first connector portions and the of air of second connector portions each have thickness that is less than a al thickness of each of thirst ring and the second ring such that a volume of each of the first gap and the second gap are increased and configured to store a greater amount of fluid that has infiltrated between the first end face and the second end face.

20. The gasket according to claim 19, wherein the first pair of connector portions are circumferentially and radially offset from second pair of connector portions such that a virtual line connecting the first pair of connector portions is arranged orthogonal to a virtual line connecting the second pair of connector portions.

\* \* \* \* \*

UNITED STATES PATENT AND TRADEMARK OFFICE
CERTIFICATE OF CORRECTION

PATENT NO. : 11,971,102 B2
APPLICATION NO. : 17/603357
DATED : April 30, 2024
INVENTOR(S) : Takeshi Watanabe et al.

It is certified that error appears in the above-identified patent and that said Letters Patent is hereby corrected as shown below:

In the Claims

Line 52 in Column 26, Claim 19, "a first housing including and" should be replaced with "a first housing and".

Line 8 in Column 27, Claim 19, "the of air of second" should be replaced with "the pair of second".

Line 9 in Column 27, Claim 19, "have thickness" should be replaced with "have an axial thickness".

Line 10 in Column 27, Claim 19, "a al thickness" should be replaced with "axial thickness".

Line 10 in Column 27, Claim 19, "each of first" should be replaced with "each of the first".

Signed and Sealed this
Ninth Day of July, 2024

Katherine Kelly Vidal
*Director of the United States Patent and Trademark Office*